(12) United States Patent
Mola Marti et al.

(10) Patent No.: US 7,827,155 B2
(45) Date of Patent: *Nov. 2, 2010

(54) SYSTEM FOR PROCESSING FORMATTED DATA

(75) Inventors: Jordi Mola Marti, Redmond, WA (US); David Ahs, Dublin (IE)

(73) Assignee: Microsoft Corporation, Redmond, WA (US)

( * ) Notice: Subject to any disclaimer, the term of this patent is extended or adjusted under 35 U.S.C. 154(b) by 515 days.

This patent is subject to a terminal disclaimer.

(21) Appl. No.: 11/409,146

(22) Filed: Apr. 21, 2006

(65) Prior Publication Data

US 2007/0260584 A1 Nov. 8, 2007

(51) Int. Cl.
*G06F 7/00* (2006.01)
*G06F 9/44* (2006.01)

(52) U.S. Cl. ..................... 707/690; 717/114
(58) Field of Classification Search .............. 707/1, 707/10, 100, 102, 103 R
See application file for complete search history.

(56) References Cited

U.S. PATENT DOCUMENTS

| | | | |
|---|---|---|---|
| 5,251,130 A | 10/1993 | Andrews et al. | |
| 5,678,039 A | 10/1997 | Hinks et al. | |
| 5,751,957 A * | 5/1998 | Hiroya et al. | 709/203 |
| 5,970,490 A * | 10/1999 | Morgenstern | 707/10 |
| 6,092,036 A | 7/2000 | Hamann | |
| 6,275,978 B1 | 8/2001 | Bell | |
| 6,278,967 B1 | 8/2001 | Akers et al. | |
| 6,393,389 B1 | 5/2002 | Chanod et al. | |
| 6,492,995 B1 | 12/2002 | Atkin et al. | |
| 6,629,313 B1 * | 9/2003 | Rowe et al. | 717/136 |
| 6,735,759 B1 | 5/2004 | Yamamoto et al. | |
| 6,904,563 B2 | 6/2005 | Kumhyr et al. | |
| 6,954,746 B1 * | 10/2005 | Batista | 706/45 |
| 6,993,473 B2 | 1/2006 | Cartus | |
| 7,031,956 B1 * | 4/2006 | Lee et al. | 707/3 |
| 7,146,361 B2 * | 12/2006 | Broder et al. | 707/5 |
| 7,269,718 B2 * | 9/2007 | Alexander et al. | 712/221 |
| 7,313,575 B2 * | 12/2007 | Carr et al. | 707/104.1 |
| 7,328,374 B2 * | 2/2008 | Alexander et al. | 714/42 |
| 7,353,165 B2 | 4/2008 | Zhou et al. | |
| 7,386,690 B2 * | 6/2008 | Alexander et al. | 711/156 |
| 7,516,229 B2 * | 4/2009 | Trastour et al. | 709/230 |

(Continued)

FOREIGN PATENT DOCUMENTS

KR 10200300055 A 1/2003

OTHER PUBLICATIONS

Brown, P., et al., "The Mathematics of Statistical Machine Translation: Parameter Estimation," *Computational Linguistics* 19(2):263-311, 1993.

(Continued)

*Primary Examiner*—Neveen Abel Jalil
*Assistant Examiner*—Tarek Chbouki
(74) *Attorney, Agent, or Firm*—Wolf, Greenfield & Sacks, P.C.

(57) ABSTRACT

A system and method for generating metadata for processing by various processing components is provided. A metadata compiler component is operable to generate metadata including one or more constraints which correspond to evaluation criteria and one or more anchor points from source data. A metadata optimizer and arbitrator is operable to normalize the metadata. Various processing components are operable to perform operations on a string using the metadata.

16 Claims, 16 Drawing Sheets

U.S. PATENT DOCUMENTS

| | | | |
|---|---|---|---|
| 2003/0188293 A1 | 10/2003 | Boucher | |
| 2004/0002848 A1 | 1/2004 | Zhou et al. | |
| 2004/0039809 A1* | 2/2004 | Ranous et al. | 709/223 |
| 2004/0078781 A1 | 4/2004 | Novy et al. | |
| 2004/0122656 A1* | 6/2004 | Abir | 704/4 |
| 2004/0123109 A1 | 6/2004 | Choi | |
| 2004/0153435 A1* | 8/2004 | Gudbjartsson et al. | 707/1 |
| 2004/0215441 A1 | 10/2004 | Orofino et al. | |
| 2004/0243645 A1* | 12/2004 | Broder et al. | 707/200 |
| 2005/0050030 A1* | 3/2005 | Gudbjartsson et al. | 707/3 |
| 2005/0125419 A1 | 6/2005 | Mizutani et al. | |
| 2005/0149557 A1 | 7/2005 | Moriya et al. | |
| 2005/0240393 A1* | 10/2005 | Glosson | 704/8 |
| 2005/0246696 A1* | 11/2005 | Alexander et al. | 717/151 |
| 2005/0251706 A1* | 11/2005 | Alexander et al. | 714/49 |
| 2005/0251707 A1* | 11/2005 | Alexander et al. | 714/49 |
| 2005/0257092 A1* | 11/2005 | Alexander et al. | 714/37 |
| 2005/0278270 A1* | 12/2005 | Carr et al. | 706/25 |
| 2006/0020946 A1* | 1/2006 | Alexander et al. | 719/315 |
| 2006/0041838 A1* | 2/2006 | Khan | 715/513 |
| 2006/0167735 A1* | 7/2006 | Ward | 705/8 |
| 2006/0174196 A1 | 8/2006 | Zhang et al. | |
| 2006/0206523 A1* | 9/2006 | Gaurav et al. | 707/104.1 |
| 2006/0235714 A1* | 10/2006 | Adinolfi et al. | 705/1 |
| 2006/0235715 A1* | 10/2006 | Abrams et al. | 705/1 |
| 2006/0235831 A1* | 10/2006 | Adinolfi et al. | 707/3 |
| 2006/0247944 A1* | 11/2006 | Calusinski et al. | 705/1 |
| 2006/0287844 A1 | 12/2006 | Rich | |
| 2006/0288285 A1* | 12/2006 | Lai et al. | 715/708 |
| 2007/0112763 A1* | 5/2007 | Broder et al. | 707/5 |
| 2007/0118540 A1* | 5/2007 | Guo | 707/100 |
| 2007/0208569 A1* | 9/2007 | Subramanian et al. | 704/270 |
| 2007/0245321 A1 | 10/2007 | Cosgrove et al. | |
| 2008/0177640 A1* | 7/2008 | Gokturk et al. | 705/27 |

OTHER PUBLICATIONS

Chalupsky, H., "Ontomorph: A Translation System for Symbolic Knowledge," in A. Cohn et al. (eds.), *Proceedings of the 7th International Conference on Principles of Knowledge Representation and Reasoning*, Morgan Kaufman, San Francisco, Calif., 2000, pp. 471-482.

Chen, F., "Aligning Sentences in Bilingual Corpora Using Lexical Information," *Proceedings of the 31st Annual Meeting of the Association for Computational Linguistics*, Columbus, Ohio, Jun. 22-26, 1993.

International Search Report from International Patent Application PCT/US2007/010085.

L-Soft Sweden AB, *LISTSERV® Maestro, Version 1.2: Translating the LISTSERV Maestro User Interface*, Mar. 18, 2004 11:10 am, 29 pages.

M-Tech Information Technology, Inc., *10.19 Adding password strength rules*, 2004 5 pages.

Rintanen and Zetzsche, *Integrating Translation Tools in Document Creation*, International Writers' Group, LLC, MultiLingual Press, reprinted with permission of translationzone.com, 1999-2005, 5 pages, www.internationalwriters.com/dejavu/Integrating_tools.html.

Schildhauer, E., *Integrating Localization Processes With Software Development*, Localization Reader 2004-2005, Localisation Research Centre, Department of Computer Science and Information Systems, University of Limerick, Ireland and MultiLingual Computing 2004, p. 106.

The Open Group, *Regular Expressions*, The Single UNIX® Specification, Version 2, 1997, 16 pages.

\* cited by examiner

SYSTEM FOR PROCESSING FORMATTED DATA

BACKGROUND

Generally described, localizing resources for computer systems during software development involves transforming source data corresponding to one market into target data corresponding to a different market. For example, localization can involve translating source data in one language into target data in another language. Localization can also involve transforming data between markets in the same language, such as transforming source data corresponding to Japanese for children into target data corresponding to Japanese for adults. A resource is generally defined as an item of data or code that can be used by more than one program or in more than one place in a program, such as a dialog box. One example of a resource is an error message string used to alert a computer user of an error condition. Additionally, the error message can contain one or more placeholders to be replaced with the value of the placeholder before the message is displayed.

Various assumptions can be associated with a resource. For example, the author of an error message such as "File <PH> not found", where "<PH>" is an example of a placeholder to be replaced with the name of a file, may assume that the file name will be provided at a later time and that the reader of the message understands the meaning of the term "file." To use the error message in various markets, it may need to be translated into several languages. In a typical development environment, a word-for-word translation may be used to localize a resource. However, the resulting translation may not capture contextual data associated with the resource. For example, a word in a resource, such as the word "file", can have more than one meaning and thus the context in which the word is used is needed to generate a correct translation. Additionally, functional items, such as placeholders, need to provide functionality in target data that corresponds to the functionality provided in source data. For example, the "<PH>" in the example error message needs to function such that it is replaced with the name of a file in any transformation of the error message.

One approach to capturing contextual and functional information during localization involves comparing each individual assumption associated with the source resource against the target resource to ensure that the target resource complies with every assumption. For example, one assumption associated with a source resource can be that invalid characters are '*' and '\'. An additional assumption associated with the same resource can be that invalid characters are '%' and '\'. To validate the target resource using these assumptions, a validation engine could first check that the target string does not contain either '*' or '\'. Next, the validation engine could check that the target string does not contain '%' and '\'. However, checking each individual assumption is not efficient. Further, individual assumptions may be incompatible with other individual assumptions or may be redundant.

Pseudo-localization of a resource can be used to ensure that assumptions are correctly captured so that they can be preserved in a target. The process of pseudo-localization typically involves generating a random pseudo-translation of a source string. The pseudo-translation can then be tested, in a process generally known as validation, to ensure that assumptions from the source string are preserved in the pseudo-translation. However, typical tools that perform pseudo-localization of a source string for testing purposes do not use the same validation techniques as tools used to validate target translations. Thus, localized software is not tested as thoroughly as would be possible if pseudo-localized resources were able to be validated in the same manner.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, the present invention is directed toward systems and methods for processing and validating formatted data. More specifically, in accordance with the present invention, source data from a user interface or data store may be compiled into metadata and used to process a string. For example, metadata may be projected onto a string, used to validate a string, used to assist in translation of a string, used to correct a string, and used to display a marked string, among other things.

In accordance with one aspect, a system for processing source data is provided. The system includes at least one compiler component operable to obtain source data and to compile the source data into metadata. Metadata may include one or more constraints which correspond to evaluation criteria and one or more anchor points for projecting the constraints onto a string. The system also includes an optimization component operable to obtain metadata from the at least one compiler component and to normalize metadata. Additionally, one or more processing components may be included in the system and may be operable to perform operations on a string in accordance with the normalized metadata.

In accordance with another aspect, a system for processing source data is provided. The system includes at least one compiler component, an optimization component, and a translation component. The compiler component may obtain source data and compile the source data into metadata. Metadata may include one or more constraints which correspond to evaluation criteria and one or more anchor points for projecting the constraints onto a string. The optimization component obtains metadata from the at least one compiler component and normalizes the metadata. Metadata and a string are obtained by the translation component as input. The translation component translates the string using the metadata.

In accordance with another aspect, a computer-readable medium having computer-readable components for processing source data is provided. The components include at least one compiler component, an optimization component, and one or more processing components. The at least one compiler component obtains source data and generates metadata. Metadata may include one or more constraints which correspond to evaluation criteria and one or more anchor points for projecting the constraints onto a string. The optimization component normalizes the metadata. The one or more processing components may process the string according to one or more constraints.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention is directed toward systems and methods for processing and validating formatted data. More specifically, in accordance with the present invention, source data is compiled into metadata including one or more constraints and one or more corresponding anchor points. The one or more constraints correspond to evaluation criteria which can be used to validate a localized version of a string. Various processing components can consume the compiled metadata. For example, metadata can be projected onto a string, used to validate a string, used to assist in translation of a string, used to correct a string, and used to display a marked string. Although the present invention will be described with relation to illustrative user interfaces and operating environments, one skilled in the relevant art will appreciate that the disclosed embodiments are illustrative in nature and should not be construed as limiting.

Figure 1:
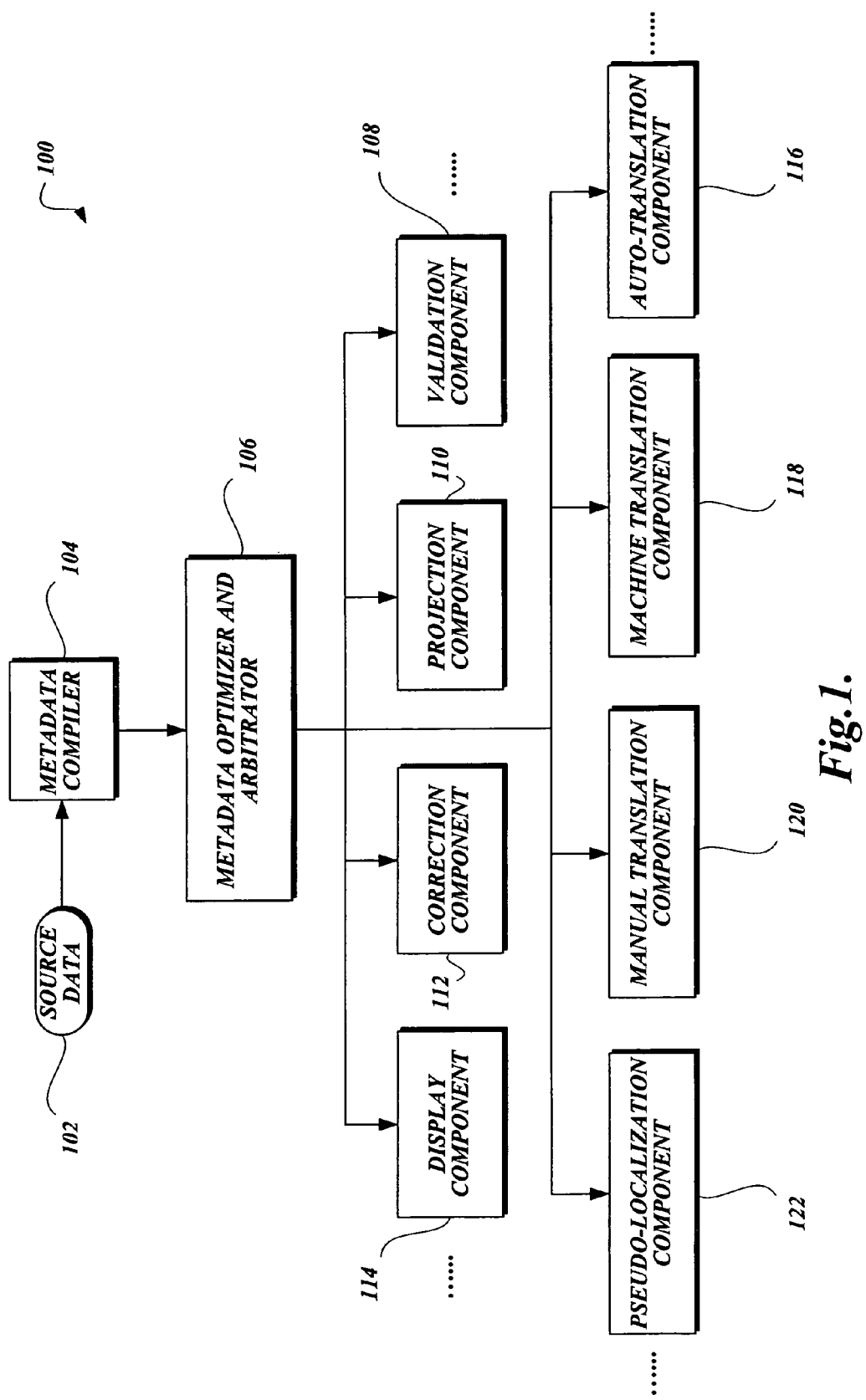
FIG. 1 is a block diagram of an illustrative operating environment including a metadata compiler, a metadata optimizer and arbitrator, and a number of processing components in accordance with an aspect of the present invention.

With reference now to FIG. 1, an illustrative operating environment 100 includes a metadata compiler 104 and a metadata optimizer and arbitrator 106 operable to generate normalized metadata for consumption by various processing and translation components. The metadata compiler 104 is operable to compile source data 102 into metadata. In an illustrative embodiment, source data 102 can include a source string. For example, source data 102 can include the following string: "This is a string." Further, source data 102 can include a rule. For example, the source data 102 could include the following rule: "{MaxLen=25}". Rules will be described in greater detail below. Source data 102 can further include resource information. Resource information can be used to specify attributes of a resource, such as the corresponding platform, the corresponding usage of the resource and the corresponding language of the resource. For example, resource information can be used to specify a particular platform that corresponds to a source or target string. Additionally, the metadata compiler 104 can infer restrictions by analyzing source data 102. For example, a compiler component 104 can infer a placeholder by parsing a source string. Alternatively, a placeholder in a source string can be inferred based on corresponding resource information.

In an illustrative embodiment, compiled metadata generated by a metadata compiler 104 can include one or more constraints which correspond to evaluation criteria and one or more anchor points for mapping the one or more constraints to a string. The metadata optimizer and arbitrator 106 obtains compiled metadata and generates normalized metadata using the compiled metadata. The normalization process will be discussed in more detail below. In an illustrative embodiment, both the compiled metadata and the normalized metadata can correspond to abstract metadata. Abstract metadata corresponds to metadata that has not yet been placed against a string. Once metadata has been compiled and normalized, the metadata can be used by one or more processing components in the operating environment 100. The processing components generally consume the metadata and can perform additional tasks. A first set of processing components 108, 110, 112, and 114 can be used to manipulate a string and/or corresponding metadata while a second set of processing components 116, 118, 120, and 122 can be used to translate a string.

Within the first set of processing components, a projection component 110 can utilize the metadata to project the one or more constraints onto a string according to the corresponding anchor points. Additionally, a validation component 108 can utilize metadata to validate a string against the one or more constraints included in the metadata. Validating a string involves evaluating the criteria associated with the constraints that correspond to the string. If the criteria corresponding to a constraint are satisfied, then the constraint evaluates to "true". Conversely, if the criteria corresponding to a constraint are not satisfied, then the constraint evaluates to "false". In an alternative embodiment, constraints evaluate to a severity level. For example, constraints may evaluate to a warning or an error. A correction component 112 can utilize metadata to modify a string such that the corresponding constraints included in the metadata are satisfied. Additionally, a display component 114 can display a string that has been marked according to corresponding metadata.

The illustrative operating environment 100 can also include a plurality of processing components operable to translate a string based on the compiled metadata. In an illustrative embodiment, the translation components can translate all or portions of a string as dictated by the metadata. Alternatively, a translation component can generate a suggested translation which violates one or more of the constraints included in the metadata. In such a case, portions of the suggested translation which violate the constraints can be marked. Marking suggested translations in this manner can signal to a user the portions of the suggested translation which need to be modified for the constraints to be satisfied. Marking will be discussed in more detail below. For example, the metadata can include one or more constraints that lock one or more portions of the string and that prevent those portions from being translated. In another example, the metadata can include a set of constraints that prevents a corresponding placeholder in a string from being translated. A translation component can also retrieve translations from a data store and cause the translations to be marked according to corresponding metadata. With continued reference to FIG. 1, the operating environment 100 can include an auto-translation component 116 operable to translate a string in accordance with corresponding metadata. As will be appreciated by one skilled in the art, auto-translation involves matching a string with a database of strings that includes corresponding translations. Further, the operating environment 100 can include a machine-translation component 118 that can translate a string in accordance with corresponding metadata. As will be appreciated by one skilled in the art, machine translation involves the use of computer hardware or software to translate text from one language into another. Still further, the operating environment 100 can include a manual translation component 120 that can translate a string in accordance with corresponding metadata. As will be appreciated by one skilled in the art, manual translation typically involves the use of a human to translate from one language into another. Even further, the operating environment 100 can include a pseudo-localization component 122 that can be used to provide a pseudo-translation of the string to be used for testing purposes. Pseudo-localization will be described in greater detail below. Although the illustrative operating environment 100 is illustrated with all of the above processing components, one skilled in the relevant art will appreciate that the operating environment 100 can vary the number of processing components. In an illustrative embodiment, metadata can be consumed in a manner that is agnostic to workflow.

In an illustrative embodiment, compiled metadata can be utilized to preserve the intent, context, and format of a communication while allowing for actual data in the transaction to be converted as appropriate to a corresponding market or locale. For example, metadata can be utilized to preserve the assumptions associated with a source string after the string has been translated. In one aspect, the constraints generated by a compiler 104 are declarative and thus describe what the corresponding restriction or assumption is, but does not describe how to fulfill it. Because the constraints are declarative, consumption of the constraints is more flexible. In an illustrative embodiment, constraints can be combined through anchoring to build more "complex" constraints.

In another aspect, constraints are categorized. In an illustrative embodiment, constraints can be categorized according to a severity level. For example, a constraint that is not satisfied can issue an error or a warning. In another embodiment, a constraint can be categorized according to whether the constraint operates on code points or characters. For example, functional constraints can operate on code points whereas terminology constraints can operate on characters. Specifically, a string representing the term "file" may be associated with a hotkey such that on a functional level the string appears as "fil&e". A terminology constraint can operate on the characters in the string "file" and would thus not see the "&" while a functional constraint can operate on code points and would be able to detect the "&". Furthermore, a constraint can be categorized according to whether it is positive or negative. For example, a positive constraint can specify how a corresponding portion of a string should appear whereas a negative constraint can specify how a corresponding portion of a string should not appear. Still further, a constraint can be categorized according to whether the constraint checks counts, elements, or sequences. For example, a count constraint can limit the length of a string or substring. A constraint that checks elements can validate based on the value of the corresponding elements. Elements can correspond to characters or code points. Additionally, constraints can be case-sensitive or case-insensitive. Likewise, constraints can be culture-sensitive or culture-insensitive. Constraints can also be regular expressions. A constraint that checks sequences can validate based on the value of the corresponding sequence, such as a substring. In a further aspect, constraints are instance agnostic. For example, a constraint on a string corresponding to the English language will validate in the same manner as a constraint on a string corresponding to the Spanish language. Alternatively, constraints can be language-specific. In a further aspect, constraints can be projected onto a string instance. Dependencies can also exist between constraints, such that, for example, the result of the evaluation of one constraint would correspond with the result of the evaluation of another constraint.

Figure 2:
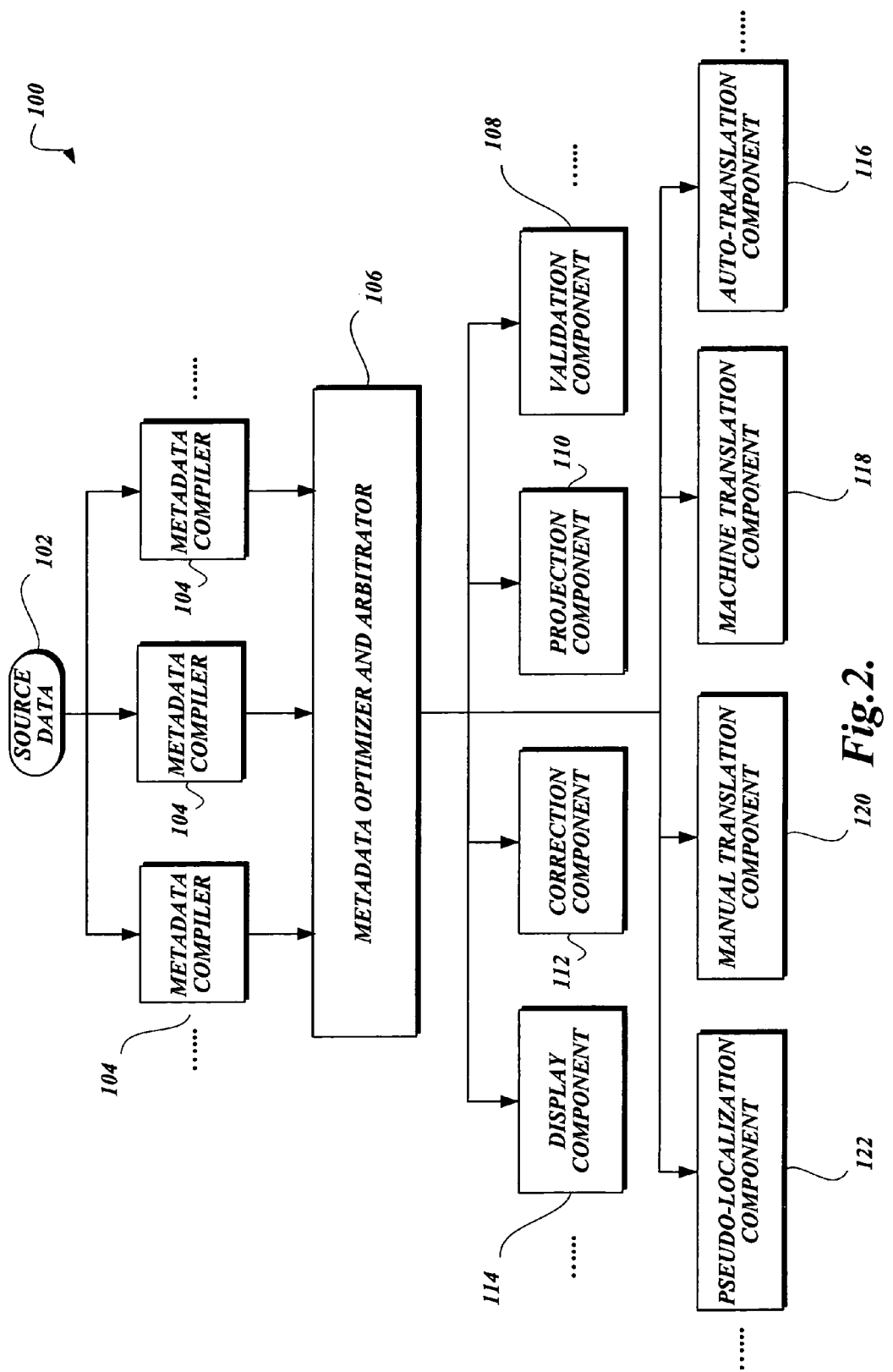
FIG. 2 is a block diagram of the operating environment of FIG. 1 illustrating a number of metadata compilers, a metadata optimizer and arbitrator, and a number of processing components in accordance with an aspect of the present invention.

With reference now to FIG. 2, the illustrative operating environment 100 of FIG. 1 can include a plurality of metadata compilers 104 operable to compile source data into metadata. In an illustrative embodiment, the plurality of metadata compilers 104 operate in parallel, such that source data 102 from several sources can be compiled into metadata. The metadata compilers 104 may also operate in series such that each compiler 104 performs a different compilation function. Further, in an illustrative embodiment, several different metadata compiler 104 versions may be operable in the illustrative operating environment 100. For example, a user responsible for entering source data may grow accustomed to the interface corresponding to a version 1.0 metadata compiler. That user can continue to use the version 1.0 compiler even as a version 2.0 compiler comes on line for use by others. As illustrated in FIG. 2, the metadata optimizer and arbitrator 106 can obtain compiled metadata from each of the metadata compilers 104 and normalize the metadata. Normalization can involve consolidating redundant constraints and resolving incompatibilities amongst constraints such that the processing components 108, 110, 112, 114, 116, 118, 120, and 122 receive a consistent set of metadata. The normalization process will be discussed in more detail below.

Figure 3:
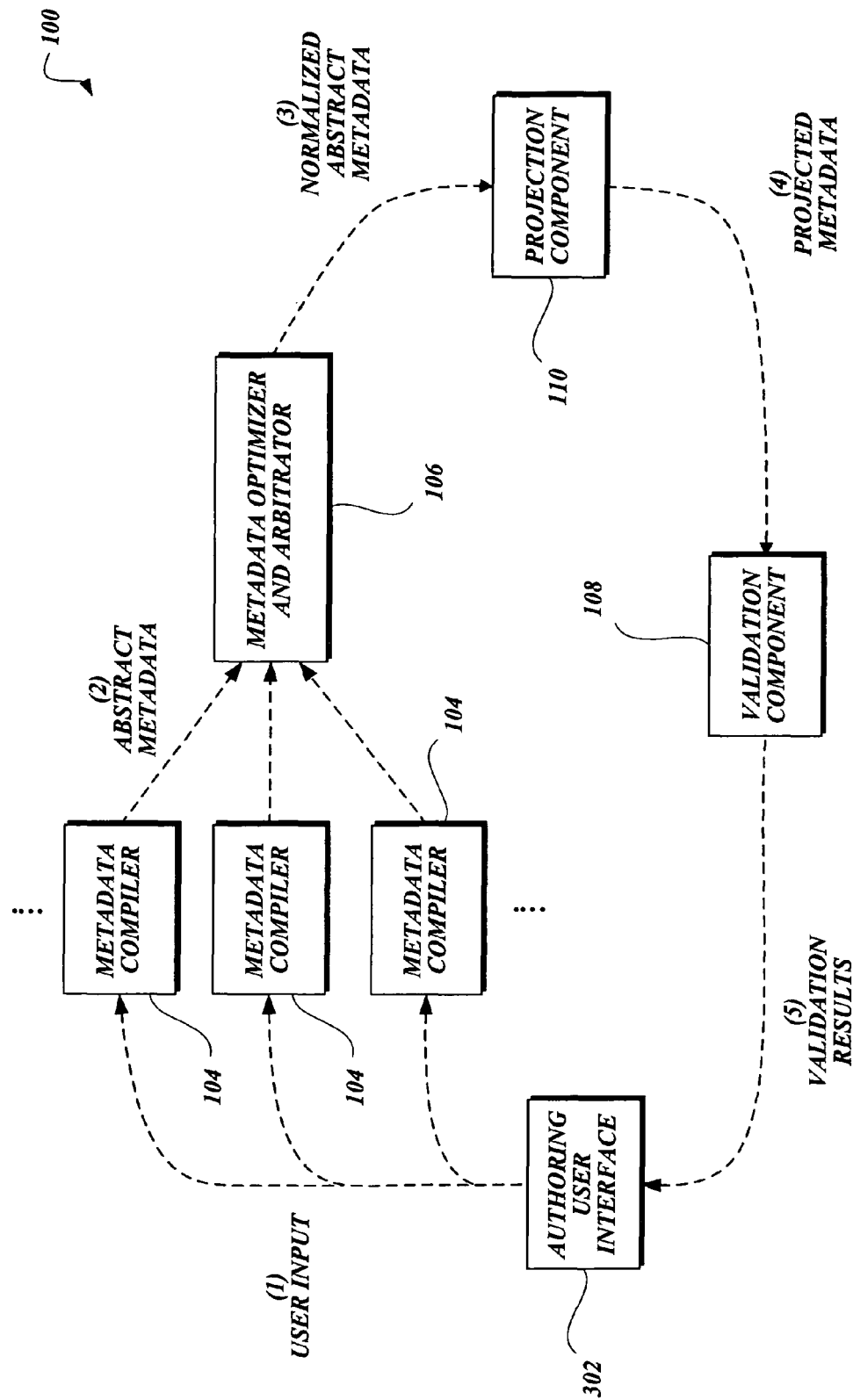
FIG. 3 is a block diagram of the operating environment of FIG. 1 illustrating the processing and validation of metadata by an authoring user interface, a number of metadata compilers, a metadata optimizer and arbitrator, a projection component, and a validation component in accordance with an aspect of the present invention.

With reference now to FIG. 3, the interaction by various components of the operating environment 100 to process and validate metadata will be described. In an illustrative embodiment, an authoring user interface 302 can obtain user input for compilation by one or more metadata compilers 104. The user input can correspond to source data 102 and can include one or more processing attributes. As discussed above, the one or more metadata compilers 104 obtains the user input as source data and compiles the user input into metadata. User input can be directed to any one or more of the metadata compilers 104. For example, a metadata compiler 104 can accept specific types of source data 102, such as source data that includes only a source string or source data that includes a source string and a rule. Further, by examining user input, a metadata compiler 104 can infer additional constraints.

Still with reference to FIG. 3, in an illustrative embodiment, the metadata optimizer and arbitrator 106 obtains abstract metadata and generates normalized abstract metadata. As will be described in greater detail below, the metadata optimizer and arbitrator 106 filters the metadata from the one or more compilers 104 to remove redundant constraints and/or incompatible constraints. A projection component 110 obtains abstract metadata and projects the metadata onto a target string. As discussed above, in an illustrative embodiment, the metadata includes one or more constraints which correspond to evaluation criteria and one or more anchor points mappable to a target string. Projecting metadata involves placing the one or more constraints on top of a target string according to the corresponding anchor points. For purposes of verification, the target string can be the source string.

A validation component 108 obtains projected metadata and validates the string against the one or more constraints. In an alternative embodiment, the validation component 108 can validate a string against abstract metadata. Validating a string against metadata involves determining whether the string satisfies the evaluation criteria corresponding to the constraints included in the metadata. In an illustrative embodiment, a string fails to validate if any corresponding evaluation criterion is not satisfied. In an alternative embodiment a string fails to validate if any corresponding evaluation criterion is not satisfied and results in the generation of an error. For example, some failed evaluation criteria can result in the generation of a warning, which may not prevent the string from validating. An authoring user interface 302 can obtain results of the validation process from the validation component 108 and display the validated string to a user. In an illustrative embodiment, the string is marked according to the corresponding constraints. For example, the string can be marked to show the user which portions of the string satisfy the constraints and which portions fail to satisfy the constraints. Further, the string can be marked to alert the user of the location of errors. For example, syntax errors in the source string can be marked. In an illustrative embodiment, the string may be auto-corrected so that it satisfies the corresponding constraints. In an alternative embodiment, suggested modifications may be displayed to a user for selection. The process of marking and displaying a string will be discussed in more detail below.

Figure 4:
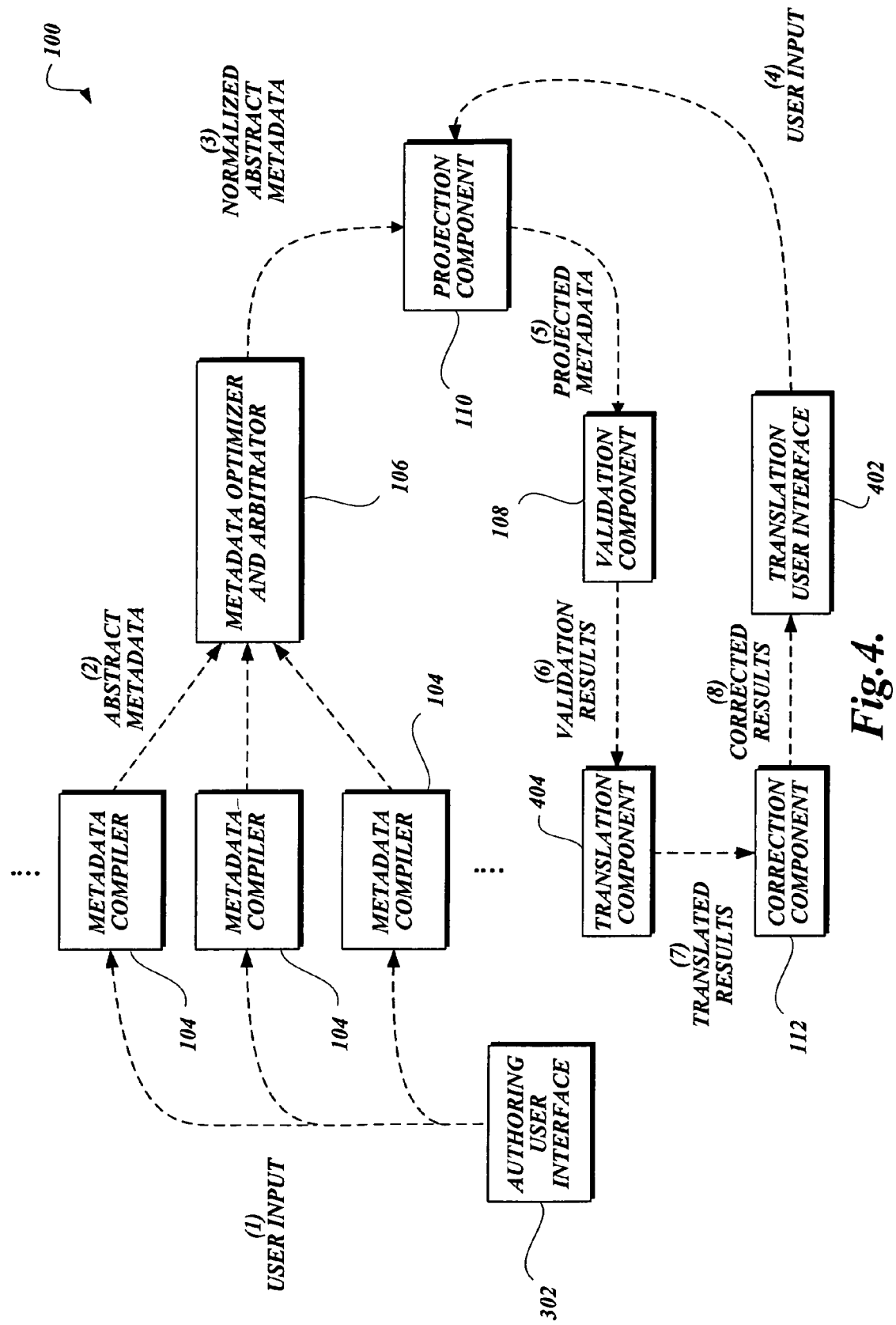
FIG. 4 is a block diagram of the operating environment of FIG. 1 illustrating the localization of strings via an authoring user interface, a number of metadata compilers, a metadata optimizer and arbitrator, a translation user interface, and a number of processing components in accordance with an aspect of the present invention.

With reference now to FIG. 4, the interaction of various components of the operating environment 100 to localize a string will be described. In an illustrative embodiment, an authoring user interface 302 can obtain user input for compilation by one or more metadata compilers 104. A metadata optimizer and arbitrator 106 obtains abstract metadata from the one or more metadata compilers 104 and generates normalized, abstract metadata as described above. A projection component 110 obtains abstract metadata and user input including a target string from a translation user interface 402 and projects the metadata onto the target string. In an illustrative embodiment, the target string is a string a user desires to validate and translate. A validation component 108 validates the target string against the projected metadata. In an alternative embodiment, the validation component 108 can obtain abstract metadata and a target string and validate the target string using the abstract metadata. Further, the validation component 108 can examine a source string and a corresponding target string and check that the same set of guarantees are present on both strings.

Translation component 404 obtains the results of the validation process and translates the validated target string. A correction component 112 can obtain translated results and can modify the translation such that it satisfies the associated metadata. Further, a translation user interface 402 can obtain the corrected results and display the corrected translation to a user. The translation user interface 402 can display a string using associated metadata to mark portions of the string. Marking a string for display to a user will be discussed in more detail below.

In an illustrative embodiment, the translation user interface 402 can obtain validation results from a validation component 108. Further, the translation user interface 402 can display a marked string so that a user can modify the string such that the string satisfies the associated constraints. Still further, suggested, selectable modifications can be presented to a user so that a user may choose which modifications to apply. For example, suggested, selectable modifications can be presented as auto-completes. In an illustrative embodiment, the translation user interface 402 can obtain translated results from the translation component 404. Further, the translation user interface 402 can display the translated string to the user with markings that correspond to the associated metadata. A user can modify the translated string such that it satisfies the associated constraints. In an illustrative embodiment, translation component 404 can correspond to an auto-translation component 116, a machine translation component 118, or a manual translation component 120. Further, translation component 404 can utilize pseudo-localization techniques to provide a pseudo-localized string. Pseudo-localization techniques will be discussed in more detail below. In an illustrative embodiment, the components of the system can be distributed. For example, user interfaces 302 and 402 can exist on client machines while the one or more compiler components 104 exit on a server. Alternatively, the user interfaces 302 and 402 and one or more compiler components 104 can exist on the same machine.

Figure 5A:
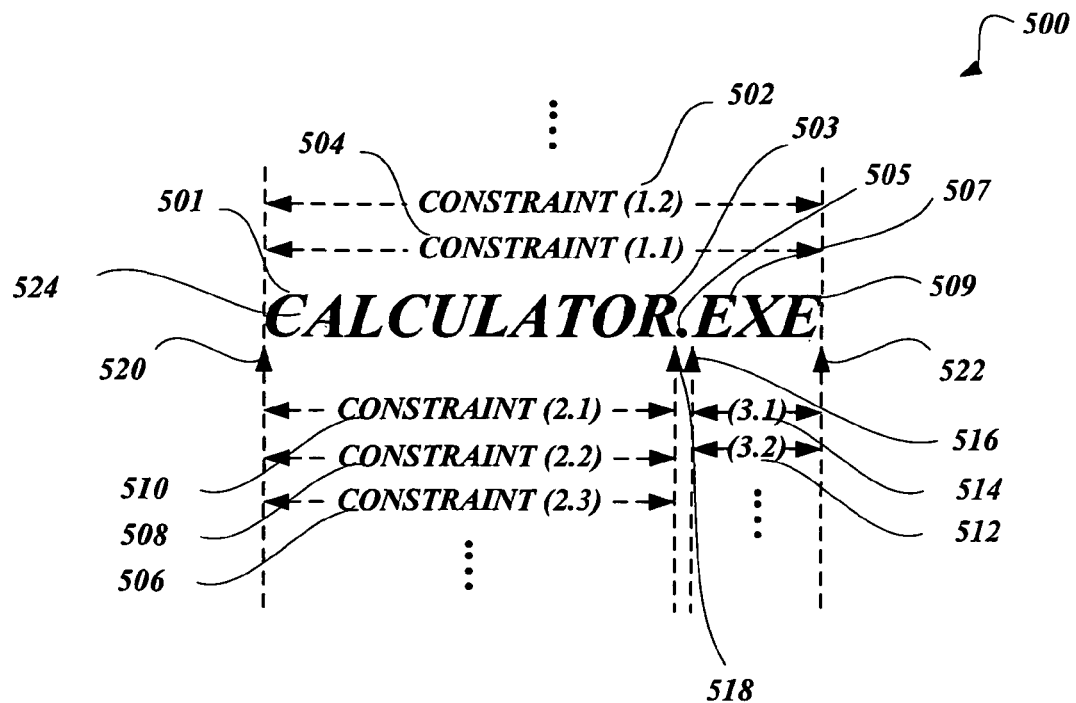
FIGS. 5A-5D are block diagrams depicting the placing of constraints against various strings according to corresponding anchor points in accordance with an aspect of the present invention.

With reference now to FIG. 5A, in an illustrative embodiment 500, metadata includes one or more constraints 502, 504, 506, 508, 510, 512, and 514 which correspond to evaluation criteria. The constraints can include one or more anchor points 520, 518, 516, and 522 which can be used to project the one or more constraints 502, 504, 506, 508, 510, 512, and 514 on top of a string 524. In an illustrative example, string 524 can correspond to a filename such as "CALCULATOR-.EXE." Constraints 1.1 and 1.2 (502 and 504) can be used to evaluate the portion of the string 524 between anchor points 520 and 522. Constraints 2.1, 2.2 and 2.3 (506, 508, and 510) can be used to evaluate the portion of the string 524 located between anchor points 520 and 518. Constraints 3.1 and 3.2 (512 and 514) can be used to evaluate the portion of the string 524 located between anchor points 516 and 522.

In an illustrative embodiment, multiple constraints can be placed between anchor points. Additionally, constraints are combinable thus allowing for an initial small set of constraints to represent a large number of concepts or assumptions. For example, there are several rules that can be used to lock a portion of a string while a single constraint can be used to implement the lock. Thus each of the rules when compiled would use the single lock constraint to implement the lock. Still further, the illustrative metadata can be used to process strings encoded in any character set, such as the ASCII character set or the Unicode character set.

The one or more anchor points 520, 518, 516, and 522 can be placed before or after elements in the string 524. For example, anchor point 520 is placed before element "C" 501. Similarly, anchor point 518 is placed after element "R" 503 and before element "." 505 while anchor point 516 is placed after element "." 505 and before element "E" 507. Likewise, anchor point 522 is placed after element "E" 509. In an illustrative embodiment, elements in a string correspond to characters, such as Unicode characters. Alternatively, elements in a string can correspond to code points, such as Unicode code points.

In an illustrative embodiment, an anchor point can be loosely anchored or hard-anchored to a point before or after any of the elements in the string. An anchor point that is hard-anchored to a point on a string is fixed to that point. Conversely, an anchor point that is loosely anchored can move within a range of points on the string. For example, a constraint can be anchored to a beginning anchor point and an ending anchor point. A constraint anchored to a loose beginning anchor point and a loose ending anchor point evaluates to "true" if the corresponding evaluation criteria can be satisfied by any sequence found between the two anchor points. Conversely, a constraint anchored to a hard beginning anchor point and a hard ending anchor point evaluates to "true" if the corresponding evaluation criteria can be satisfied by the sequence that starts at the beginning anchor point and ends at the ending anchor point. Further, a constraint that is not anchored evaluates to "true" if any sequence within the string 524 satisfies the constraint. Still further, constraints can be anchored in one manner to one anchor point and anchored in another manner to another anchor point. In regards to terminology within the present application, describing a constraint as hard-anchored to an anchor point is equivalent to describing the constraint as anchored to a hard anchor point. Similarly, describing a constraint as loosely-anchored to an anchor point is equivalent to describing the constraint as anchored to a loose anchor point. Examples of various types of anchoring will be provided below.

In an illustrative embodiment, the one or more constraints 502, 504, 506, 508, 510, 512, and 514 can be projected onto a string 524 at runtime. Further, the one or more constraints 502, 504, 506, 508, 510, 512, and 514 can be evaluated at runtime. Compiling the one or more constraints 502, 504, 506, 508, 510, 512, and 514 and one or more anchor points 520, 518, 516, and 522 from source data is more computationally intensive than projecting and validating the constraints. Therefore, allowing projection and validation of constraints against a string at runtime without requiring re-compilation provides for more efficient processing of strings. In an illustrative embodiment, the one or more constraints 502, 504, 506, 508, 510, 512, and 514 cannot be projected onto a string in a manner that would validate the string if the string is in fact invalid.

Figure 5B:
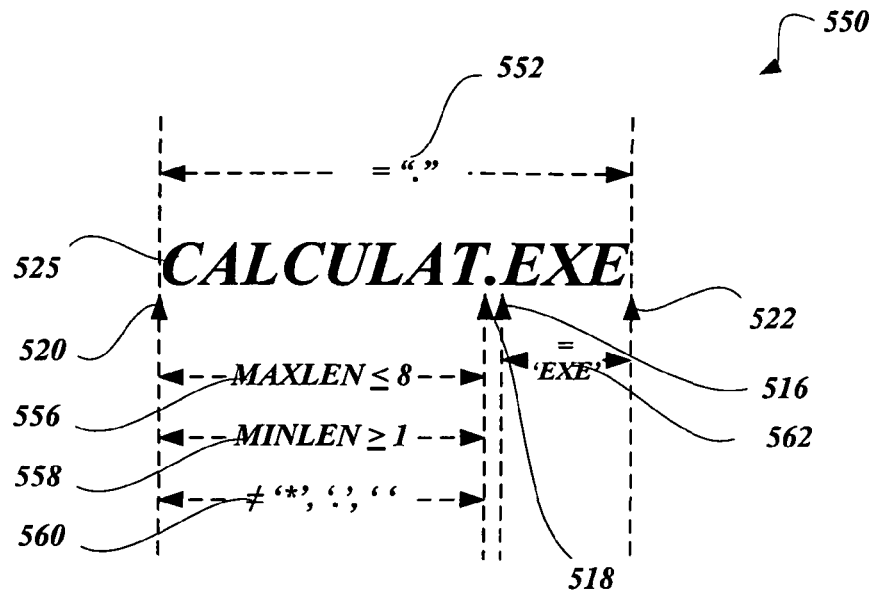

With reference now to FIG. 5B, in an illustrative embodiment 550, constraints 552, 556, 558, 560, and 562 can be used to validate string 525. For example, string 525 can be representative of a filename in a computer system that must conform to the specified constraints 552, 556, 558, 560, and 562 to be valid. Before validating string 525, constraints 552, 556, 558, 560, and 562 can be placed on top of the string 525 using anchor points 516, 518, 520, and 522. For example, projection component 110 can place constraints 552, 556, 558, 560, and 562 onto string 525 according to anchor points 516, 518, 520, and 522. In an illustrative embodiment, the constraints 552, 556, 558, 560, and 562 can be projected onto the string using the following procedure:

(1) Identify the beginning of the string as anchor point 520.
(2) Identify the end of the string as anchor point 522.
(3) Add constraint 552 that requires the string to contain the sequence of elements "." (dot).
(4) Identify the beginning of the dot as anchor point 518.
(5) Identify the end of the dot as anchor point 516.
(6) Add constraint 556 anchored to anchor points 520 and 518 that requires the substring to have at most 8 elements.
(7) Add constraint 556 anchored to anchor points 520 and 518 that requires the substring to have at least 1 element.
(8) Add constraint 560 anchored to anchor points 520 and 518 that contains the list of invalid elements for a file name (asterisk, dot, space, etc.).
(9) Add constraint 562 anchored to anchor points 516 and 522 that requires the substring to be the sequence of elements "exe" (case insensitive).

In this manner, a simple, small set of constraints can be used to build "complex" constraints. In an illustrative embodiment, a user may build the "complex" filename constraint described above by entering a rule corresponding to each constraint into an authoring user interface 302 and running the constraints through the illustrative operating environment 100 depicted in FIG. 3. In another embodiment, a user can simply enter a string into the authoring user interface 302 which the one or more metadata compilers 104 interprets as a filename and uses to generate the set of constraints depicted in FIG. 5B. In a further embodiment, a user can enter a source string representative of a filename and a set of attributes which instruct the one or more metadata compilers 104 to generate the set of constraints which correspond to a filename. In a further embodiment, a user can enter a source string representative of a filename and a rule, such as {FILENAME}, which compiles into constraints 552, 556, 558, 560, and 562.

The exemplary constraints 552, 556, 558, 560, and 562 depicted in FIG. 5B can be used to validate the string 525. For example, validation component 108 can utilized constraints 552, 556, 558, 560, and 562 to validate string 525. As described above, projected constraints 552, 556, 558, 560, and 562 can be hard-anchored, loosely anchored, or not anchored to the string 525. In an illustrative embodiment, the type of anchoring used to place a constraint is determined by the corresponding evaluation criteria. Constraint 552 is an example of a constraint that may not be anchored to string 525. A constraint that is not anchored to string 525 must be separated from anchor point 520 on its left side by a minimum of 0 characters towards the end and must be separated from anchor point 522 on its right by a minimum of 0 characters towards the beginning. Thus, a constraint that is not anchored evaluates to "true" if some portion of string 525 satisfies the constraint. In the illustrative example, constraint 552 evaluates to "true" because the portion of the string between anchor points 518 and 516 satisfies the constraint.

A constraint that is not anchored is equivalent to a constraint that is loosely anchored to the beginning of string 525 and loosely anchored to the end of string 525. A constraint that is loosely anchored allows elements to exist or be inserted between the portion of the string that satisfies the constraint and its anchor point. For example, a constraint that requires the sequence "CUL" to be contained between anchor points 520 and 518 can be loosely anchored to anchor point 520 and loosely anchored to anchor point 518. The loose anchoring on each end of this exemplary constraint allows string 525 to satisfy this constraint even though the sequence "CAL" exists between the beginning of the constraint and anchor point 520 and sequence "AT" exists between the end of the constraint and anchor point 518.

In an illustrative embodiment, constraint 556 is an example of a constraint that is hard-anchored to anchor point 520 and hard-anchored to anchor point 518. Hard-anchoring a constraint to an anchor point forbids elements from appearing between the anchor point and the constraint. Constraint 556 is satisfied when eight or fewer elements are contained between anchor points 520 and 518. Because the sequence contained between anchor points 520 and 518 contains exactly 8 characters, the constraint is satisfied. If the constraint were not hard-anchored to anchor points 520 and 518, then additional elements could exist between the anchor points and the constraint and thus the constraint could be satisfied in situations in which the sequence between anchor points 520 and 518 contained more than eight elements. Constraint 558 is an example of a constraint that can be hard-anchored to anchor point 520 and that can be hard-anchored to anchor point 518. Constraint 558 is satisfied when one or more items are contained between anchor points 520 and 518. Because the sequence contained between anchor points 520 and 518 contains eight items, and one≦eight, the constraint 558 is satisfied. In an alternative embodiment, constraint 558 can be hard-anchored to anchor point 520 and loosely anchored to anchor point 518.

With continued reference to FIG. 5B, constraint 560 is hard-anchored to anchor point 520 and hard-anchored to anchor point 518. Constraint 560 evaluates to "true" if each element in the sequence between anchor points 520 and 518 does not equal an asterisk, a period, or a space. Because none of the restricted items appear in the sequence between anchor points 520 and 518, the constraint evaluates to "true." Constraint 562 is hard-anchored to anchor point 516 and hard-anchored to anchor point 522. Further, constraint 562 evaluates to "true" if the sequence between anchor points 516 and 522 is equal to the sequence "EXE" (case insensitive). Because the sequence between anchor points 516 and 522 equals "EXE", constraint 562 evaluates to "true." Although not depicted in FIG. 5B, a constraint that required string 525 to end with the sequence ".EXE" would be hard-anchored to anchor point 522 and either not anchored at the beginning or loosely anchored to anchor point 520. Conversely, a constraint that required string 525 to begin with the sequence "CAL" would be hard-anchored to anchor point 520 and either not anchored at the end or loosely anchored to anchor point 522.

In an illustrative embodiment, multiple types of anchor points can exist at the same point on a string. For example anchor point 522 can correspond to a loose anchor point and a hard anchor point. In an illustrative embodiment, constraint 552 could be loosely anchored to anchor point 522 whereas constraint 562 could be hard-anchored to anchor point 522.

In an illustrative embodiment, FIG. 5B depicts how string 524 from FIG. 5A could be modified such that it satisfies exemplary constraints 552, 556, 558, 560, and 562. For example, string 524 can be modified by correction component 112 such that constraints 552, 556, 558, 560, and 562 are satisfied. String 524 can be modified in an authoring user interface 302 or a translation user interface 402 according to markings on the string. Further, string 525 ("CALCULAT.EXE") can be the result of a user entering string 524 ("CALCULATOR.EXE") into a translation user interface 402 and validating and correcting string 524 against constraints 552, 556, 558, 560, and 562. Constraints can be configured such that they are case-sensitive or case-insensitive. For example, constraint 562 can be configured such that it is case sensitive and will only match against the sequence "EXE". Alternatively, constraint 562 could be configured such that it is case insensitive and will match against any combination of uppercase and lowercase characters which combine to spell "exe".

Figure 5C:
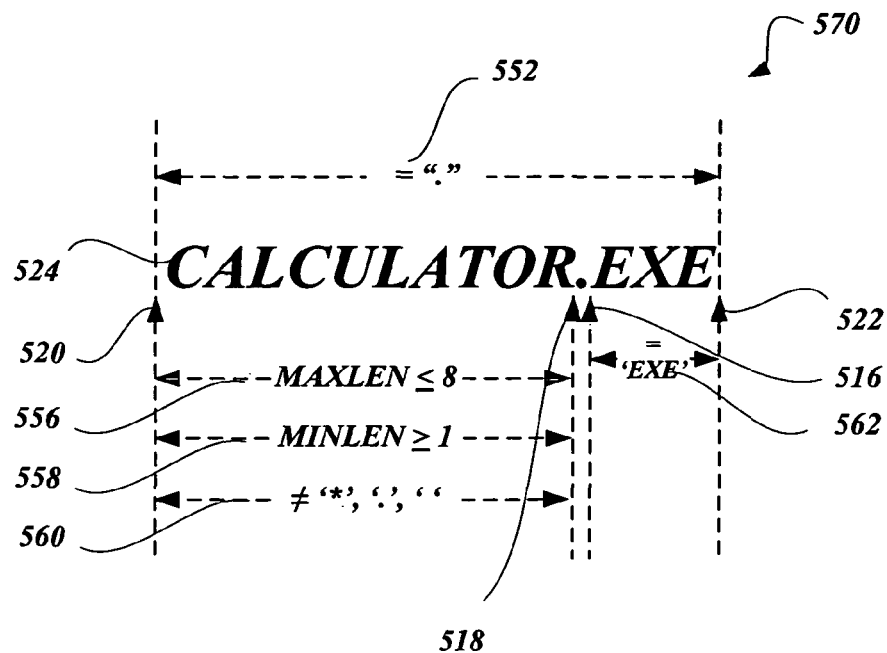

With reference now to FIG. 5C, constraints 552, 556, 558, 560, and 562 can be used in an attempt to validate string 524. In an illustrative embodiment, a user can enter string 524 into a translation user interface 402 and attempt to determine whether the string 524 is a valid filename using constraints 552, 556, 558, 560, and 562. Although constraints 552, 558, 560, and 562 evaluate to "true", constraint 556 evaluates to "false", and thus string 524 would not be valid. In an illustrative embodiment, it is not possible to place a set of constraints against a string in a manner that validates an invalid string. Thus, users can direct the placing of constraints against a string to be validated. This allows for compilation to take place prior to runtime while placing and validating can be performed at runtime. In a typical environment, compilation is significantly more computationally expensive than placing and validation, and thus significant efficiencies can be realized by performing compilation prior to runtime.

Figure 5D:
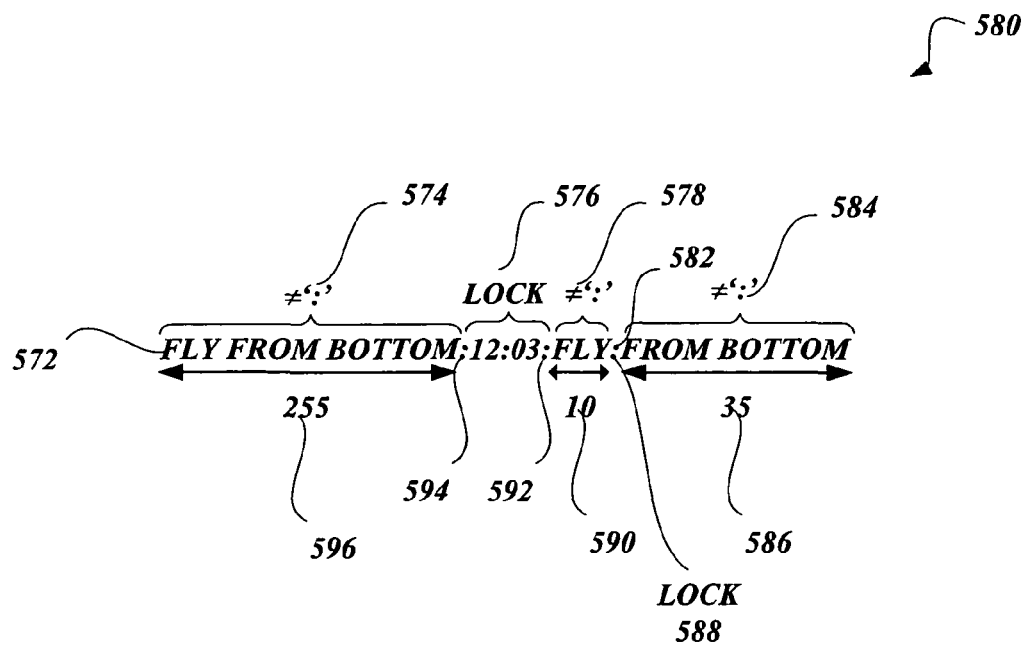

With reference now to FIG. 5D, several constraints 596, 590, 586, 574, 576, 578, and 584 can be projected onto an exemplary string 572 and assist in processing the string 572. In an illustrative embodiment, constraint 596 limits the portion of the string 572 before the first colon 594 to a maximum of 255 elements. In a similar manner, constraint 590 limits the portion of the string 572 after the third colon 592 and before the fourth colon 582 to a maximum of 10 elements. Similarly, constraint 586 limits the portion of the string 572 after the fourth colon 582 to a maximum of 35 elements. Because each substring contains less than the maximum number of constraints specified by the associated constraints, each of the maximum-length constraints 596, 590, and 586 is satisfied. Constraints 574, 578, and 584 forbid any of the elements in the respective, associated substrings from containing a ":" (colon). Because none of the substrings contain colons, constraints 574, 578, and 584 are satisfied. Constraints 576 and 588 are lock constraints that prevent the corresponding sequence from being localized. Thus, lock 576 prevents the substring ":12:03:" from being localized while lock 588 prevents the fourth colon 582 from being localized.

Although FIGS. 5A-5D depict strings in English, which is written from left to right, it will be appreciated that the present invention can process and translate resources in any language. For example, the present invention is aware of right-to-left languages, such as Arabic and Hebrew, and works appropriately with them. In an illustrative embodiment, the present invention conducts operations on the internal representation of a string in memory, as opposed to the display view, in order to deal appropriately with strings in any language.

In an illustrative embodiment, rules can be used to generate metadata. For example, a user can input a rule, in addition to a source string, using the authoring user interface 302. In an illustrative embodiment, a rule can be compiled into metadata including one or more constraints which correspond to evaluation criteria and one or more corresponding anchor points. Further, the metadata can be used to validate a string. Several different types of rules can be used to generate constraints. For example, the rule set (or instruction set) can include rules that correspond to fixed placeholders, numbered placeholders, escaped characters, escaped placeholder characters, invalid characters, valid characters, restrictions relating to sequences that can be used to begin or end a string, and restrictions related to sequences that must appear in the string. Further, the rule set can include a split rule and a substring rule.

In an illustrative embodiment, a placeholder can have special meaning and is analogous to a variable that needs to be replaced by its value before it is displayed. Placeholders are typically not translated by a translation component 404. For example, a set of constraints can be operable to prevent a corresponding placeholder from being translated. In an illustrative embodiment, fixed placeholders correspond to a specific type. For example, a fixed placeholder can be represented by a sequence, such as '% s' or '% d'. Further, before a fixed placeholder is displayed it can be replaced with a value of the type specified by the fixed placeholder. For example, a fixed placeholder of the type '% s' can be replaced with a string whereas a fixed placeholder of the type '% d' can be replaced with an integer. In an illustrative embodiment, a fixed placeholder in a source string cannot be switched with another placeholder in the source string. Further, fixed placeholders appear in a translation in the same order as they appear in a source string. Because the ordering of fixed placeholders is preserved in a translation, the number of occurrences of fixed placeholders is implicitly preserved.

In an illustrative embodiment, a numbered placeholder corresponds to an index. Further, numbered placeholders can be swapped and repeated in a source string. Still further, numbered placeholders can exist in a translation in any order. For example, numbered placeholder '{0}' may appear before numbered placeholder '{1}' in a source string, but can appear after numbered placeholder '{1}' in a translation. In an illustrative embodiment, fixed placeholders and numbered placeholders can be inserted into a string by a user wherever the corresponding placeholders should appear. However, in practice, a target string is not valid if the count of fixed placeholders in the target string differs from the count of fixed placeholders in a corresponding source string.

In an illustrative embodiment, a rule can indicate character or character sequences to be escaped. For example, the character '\' can have special meaning within a string and should thus be escaped, such as by preceding the character with another '\'. In an illustrative embodiment, the syntax to create an escaped character constraint is of the form {EscapeChars, 'x=yy'}, where 'x' is a sequence of characters that cannot exist in the string and 'yy' is a sequence of characters that should be used instead of 'x'. Further, in an illustrative embodiment, if 'yy' is empty, then the corresponding 'x' parameter cannot exist in the string. A similar rule can indicate character or character sequences to be escaped within a string or substring, except for within the regions covered by a specific set of constraints, such as the set of constraints defined by a placeholder. This rule can prevent a user from accidentally adding a placeholder in a string.

In an illustrative embodiment, a rule can correspond to a constraint which forces a string or substring to only contain a set of characters. The characters can be defined as a regular expression span, a set of characters, or a codepage. Conversely, a rule can correspond to a constraint which forces a string or substring to not contain a set of characters. For example, constraint 560 of FIG. 5B can be generated by such a rule. Rules can also correspond to constraints which verify that a string begins, contains, or ends with a specified value. For example, in an illustrative embodiment, constraints 552 and 562 of FIG. 5B can be compiled from rules that correspond to constraints to verify whether a string contains or ends with a specified sequence of characters, respectively.

In another illustrative embodiment, a split rule can also be used to divide a string into substrings according to specified parameters. The split rule protects the section of a string covered by the parameters and requires those sections to exist in a corresponding translation. Further, sections of a string not covered by the parameters can be used as substrings. Even further, the substrings found can be used as substring parameters in other rules. Other rules can be dependent on the split rule, and thus the split rule can be processed before any rule that can use the substring parameters.

In another illustrative embodiment, a substring rule can also be used to divide a string into substrings according to specified parameters. The substring rule protects the section of a string not covered by the parameters and requires those sections to exist in a corresponding translation. Further, sections of a string covered by the parameters can be used as substrings. In a manner similar to the split rule, the substrings found can be used as substring parameters in other rules. Other rules may be dependent on the substring rule, and thus the substring rule would be processed before any rule that can use the substring parameters.

In an illustrative embodiment, substring and positional parameters can be used with the rules to generate constraints with corresponding anchor points. Positional parameters essentially expose the anchor points in a string to a user. Further, a user can specify whether a parameter is case-sensitive, case-insensitive or a regular expression. Still further, multiple types of parameters can be combined within a rule. Even further, culture parameters can be represented by numeric values or string values.

In an illustrative embodiment, positional parameters can be used to specify portions of a string to which a constraint applies. Positional parameters can use the following syntax: (s+|e−)x . . . (s+|e−)y. In the exemplary syntax, 'x' specifies the beginning position and 'y' specifies the ending position within a string. Further, 's+' and 'e−' are optional modifiers which specify that the position is from the start or from the end of a string and that the position is anchored to that location. Parameters can operate on virtual separators between characters in a string. For example, parameter 's+0' indicates the position prior to the first character in a string. Conversely, parameter 'e−0' indicates the position after the last character in a string. To specify a position that covers the first character in a string, parameters 's+0 . . . s+1' can be used. As an example of a rule with positional parameters, the rule {ValidStrings=s+0 . . . s+2, "He"} creates a constraint on a corresponding string in which the first two characters must be 'He'.

In an illustrative embodiment, substring parameters can be used for specifying a substring that has been generated according to a rule that divides a string. For example, the {split} rule and the {Substring} rule can be used to divide a string into substrings. Substrings can be numbered using a zero-based index calculated from the beginning of the original undivided string. Substring parameters can use the syntax s'x−y', where x is the first substring and −y is optional and describes a range of substrings. Still further, by using the literal character 'x' as opposed to a non-negative number, the 'x' is replaced by the last substring found in the original string. Alternatively, by using a substring parameter of "s'*'", the rule applies to all substrings. As an example of how substring parameters can be used, if a user enters the string "Excel files|*.xls|All Files|*.*" along with the rules {Split="|"} and {Lock=s '1', s'3' } into the authoring user interface 302, the string will be split on the '|' character. Further, the first and third substrings—'|*.xls|' and '|*.*'—generated by the split rule will not be localized according to the lock instruction.

Figure 6:
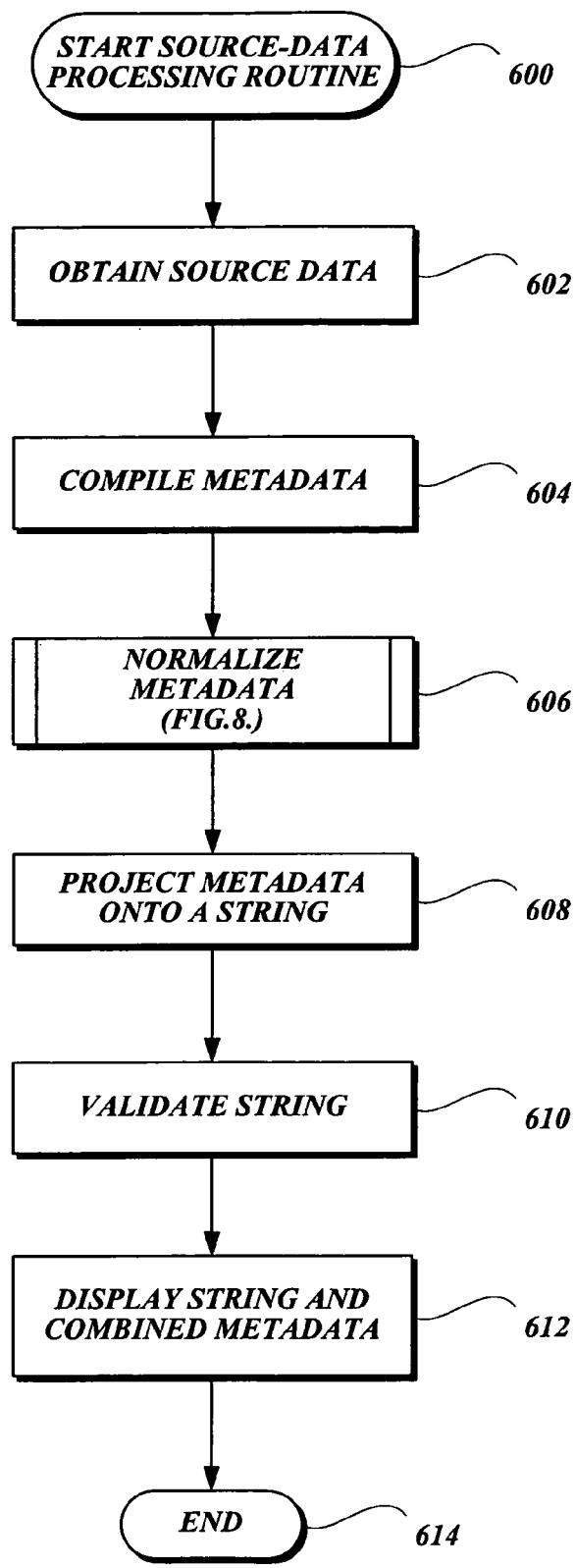
FIG. 6 is a flow diagram illustrating a source-data processing routine implemented by the operating environment of FIG. 3 in accordance with an aspect of the present invention.

FIG. 6 is a flow diagram illustrative of a source-data processing routine 600 which can be implemented by the illustrative operating environment 100 depicted in FIG. 3 in accordance with an aspect of the present invention. At block 602, the one or more metadata compilers 104 obtains source data. In an illustrative embodiment, the source data is in the form of user input from an authoring user interface 302. Further, the source data can include a source string. Still further, the source data can include attributes, such as an instruction, additional resource information, and/or an inferred restriction. In an illustrative embodiment, a facade component can direct the source data from the authoring user interface 302 to the appropriate metadata compiler based on the characteristics of the source data. At block 604, the source data is compiled into metadata. In an illustrative embodiment, the metadata can include one or more constraints which correspond to evaluation criteria and one or more anchor points operable to project the constraints onto a string.

Figure 8:
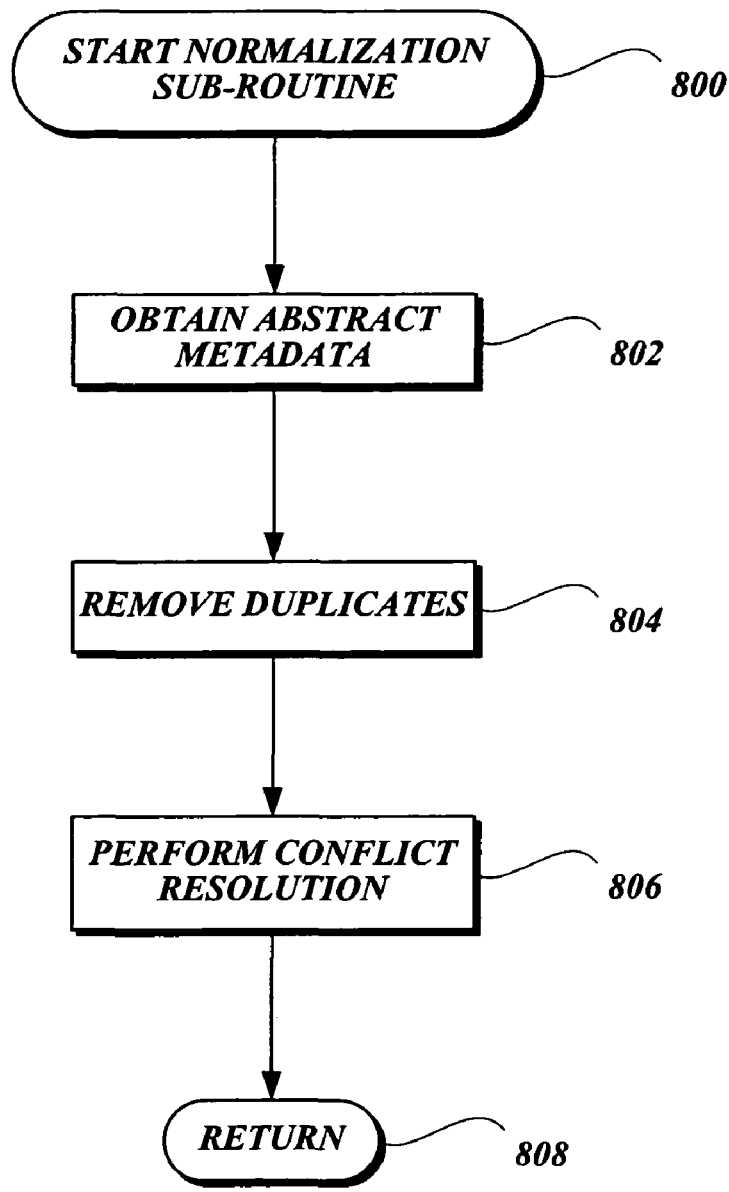
FIG. 8 is a flow diagram illustrating a normalization subroutine implemented by a metadata optimizer and arbitrator in accordance with an aspect of the present invention.

At block 604, the metadata optimizer and arbitrator 106 normalizes the metadata. FIG. 8 is a flow diagram of a normalization sub-routine 800 implemented by the metadata optimizer and arbitrator 106 in accordance with an aspect of the present invention. At block 802, the metadata optimizer and arbitrator 106 obtains abstract metadata. In an illustrative embodiment, the abstract metadata can be obtained from one or more metadata compilers 104. At block 804, the metadata optimizer and arbitrator 106 reduces redundant constraints to a single equivalent constraint. For example, if one constraint on a target string specifies a maximum length of twenty elements while another constraint on the target string specifies a maximum length of ten, then the metadata optimizer and arbitrator 106 can reduce the two constraints to a single equivalent constraint specifying a maximum length of ten. The metadata optimizer and arbitrator can make this reduction because any string shorter containing fewer than ten elements will also contain fewer than twenty elements.

At block 806, the metadata optimizer and arbitrator performs conflict resolution. Conflict resolution can include resolving incompatibilities amongst a plurality of constraints. For example, one constraint can specify a maximum length of ten while another constraint specifies a minimum length of twenty. Clearly, no single string can satisfy both of these constraints and thus the constraints are incompatible. The metadata optimizer and arbitrator 106 can resolve the incompatibility. In an illustrative embodiment, the optimizer 106 can resolve the conflict by simply picking one constraint and discarding the other. Further, the metadata optimizer and arbitrator 106 can provide a warning that an incompatible constraint is being discarded. Alternatively, a user or administrator can decide which constraint to keep. In an illustrative embodiment, incompatibilities can be resolved based on other attributes associated with a source or target string. Incompatible and/or redundant constraints can be generated by multiple metadata compilers 104 or can be generated by a single metadata compiler 104. In an illustrative embodiment, the metadata optimizer and arbitrator 106 makes no assumptions about inputs. For example, the optimizer 106 does not assume that metadata from a single compiler is free of incompatible or redundant constraints. At block 808, the sub-routine 800 returns to routine 600.

Returning to FIG. 6, at block 608 a projection component 110 projects metadata onto a string. The string can be a target string entered by a user at the translation user interface 402. Further, the metadata can be normalized, abstract metadata obtained from the metadata optimizer and arbitrator 106. In an illustrative embodiment, projecting metadata onto a string involves placing constraints and their associated evaluation criteria on top of the string according to the corresponding one or more anchor points. For example, constraints 552, 556, 558, 560, and 562 can be projected onto string "CALCULAT.EXE" 525 using anchor points 520, 518, 516, and 522 as depicted in FIG. 5B.

At block 610, a validation component 108 validates a string against the projected metadata. In an illustrative embodiment, validating a constraint involves evaluating the portion of the string to which the constraint is mapped to determine whether the mapped portion satisfies the evaluation criteria that corresponds to the constraint. For example, constraint 556 in FIG. 5B is evaluated by determining whether the portion of the string between anchor points 520 and 518 has less than 8 elements. Because the portion of the string to which the constraint 556 is mapped ("CALCULAT") has less than 8 elements, the constraint evaluates to "true." In an illustrative embodiment, validation component 108 continues processing the other constraints associated with a string until all constraints have been evaluated. Further, in an illustrative embodiment, a string is valid if all associated constraints evaluate to "true." A string is not valid if any of the constraints evaluate to "false." Nevertheless, a string can be valid if some constraints are not satisfied. For example, if a failed constraint generates a warning message as opposed to an error message, then a corresponding string can still be valid.

At block 612, a validated string along with the metadata used to validate the string can be displayed to a user. In an illustrative embodiment, a string and combined metadata can be displayed on an authoring user interface 302. Further, the metadata can be used to mark a string such that a user can determine which portions of the string are valid and which portions are not valid. Marking and displaying a string will be discussed in more detail below in relations to FIGS. 12-15. At block 614, the routine 600 terminates.

Figure 7:
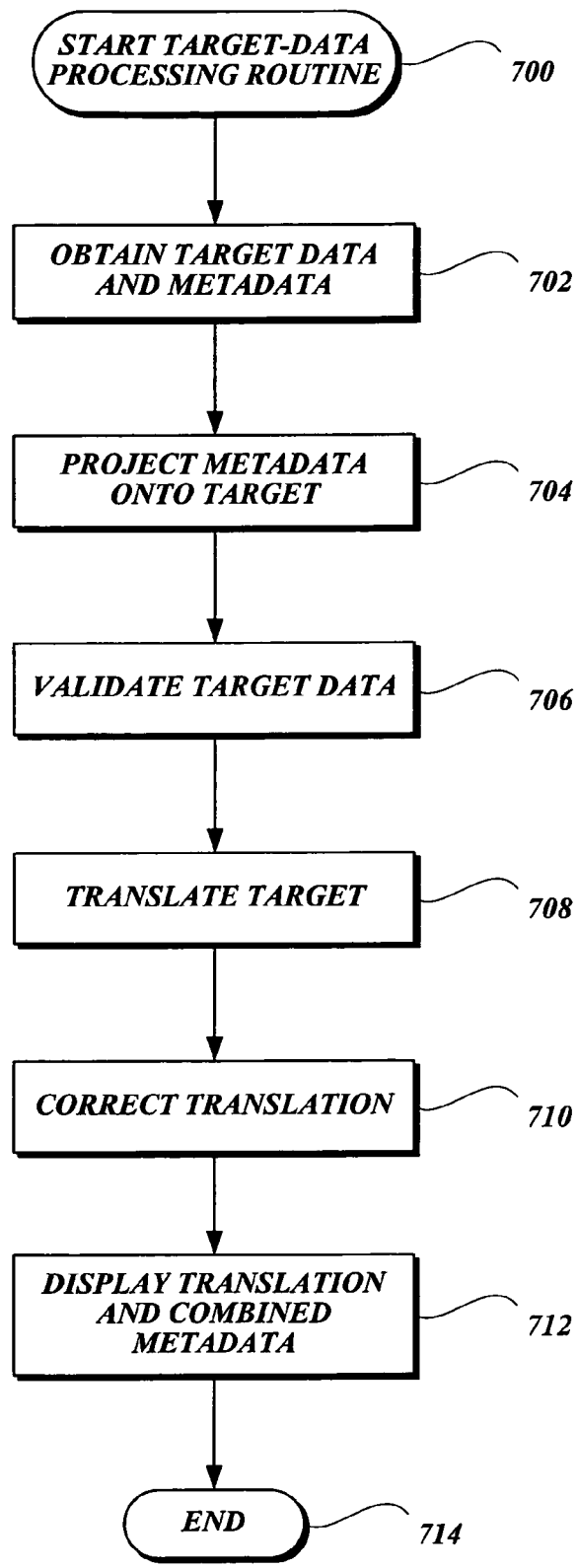
FIG. 7 is a flow diagram illustrating a target-data processing routine implemented by the operating environment of FIG. 4 in accordance with an aspect of the present invention.

FIG. 7 is a flow diagram illustrative of a target-data processing routine 700 which can be implemented by the illustrative operating environment 100 depicted in FIG. 4 in accordance with an aspect of the present invention. At block 702 a projection component 110 obtains target data and metadata. In an illustrative embodiment, the projection component 110 can obtain target data from a translation user interface 402. Further, the target data can include a target string. Still further, the target data can include attributes corresponding to the string. In an illustrative embodiment, the projection component 110 can obtain normalized abstract metadata from the metadata optimizer and arbitrator 106. Alternatively, the projection component 110 can obtain metadata from a data store.

At block 704, the projection component 110 projects metadata onto the target string. Examples of strings with projected metadata are depicted in FIGS. 5B-5D. At block 706, a validation component 108 validates the target string. In an illustrative embodiment, the metadata obtained at block 702 can include constraints operable to validate a particular type of string, such as a filename, and the target data can include a string to be validated for conformity with the requirements of the particular type of string.

With continued reference to FIG. 7, at block 708, a translation component 404 translates the target. Lock constraints can be mapped to one or more portions of a target string and thus restrict the one or more portion of the string from being translated. For example, a placeholder restriction can prevent a corresponding placeholder in a target string from being translated. In an illustrative embodiment, a string can be translated from any source language to any target language. Further, the translation component 404 can perform pseudo-localization of a string. Pseudo-localization will be discussed in more detail below. At block 710, the translated target can be corrected. For example, the translated target string may not satisfy the constraints included in the projected metadata. A string that does not satisfy associated constraints can be modified such that the modified string satisfies the constraints. For example, string 524 from FIG. 5A can be modified by deleting "OR" to conform with the constraints 552, 556, 558, 560, and 562 depicted in FIG. 5B. At block 712, the translation and associated metadata is displayed to a user. In an illustrative embodiment, the translation can be displayed on translation user interface 402. Further, the associated metadata can be used to mark the string. Marking of a string will be discussed in more detail below. At block 714, the routine 700 terminates.

Figure 9:
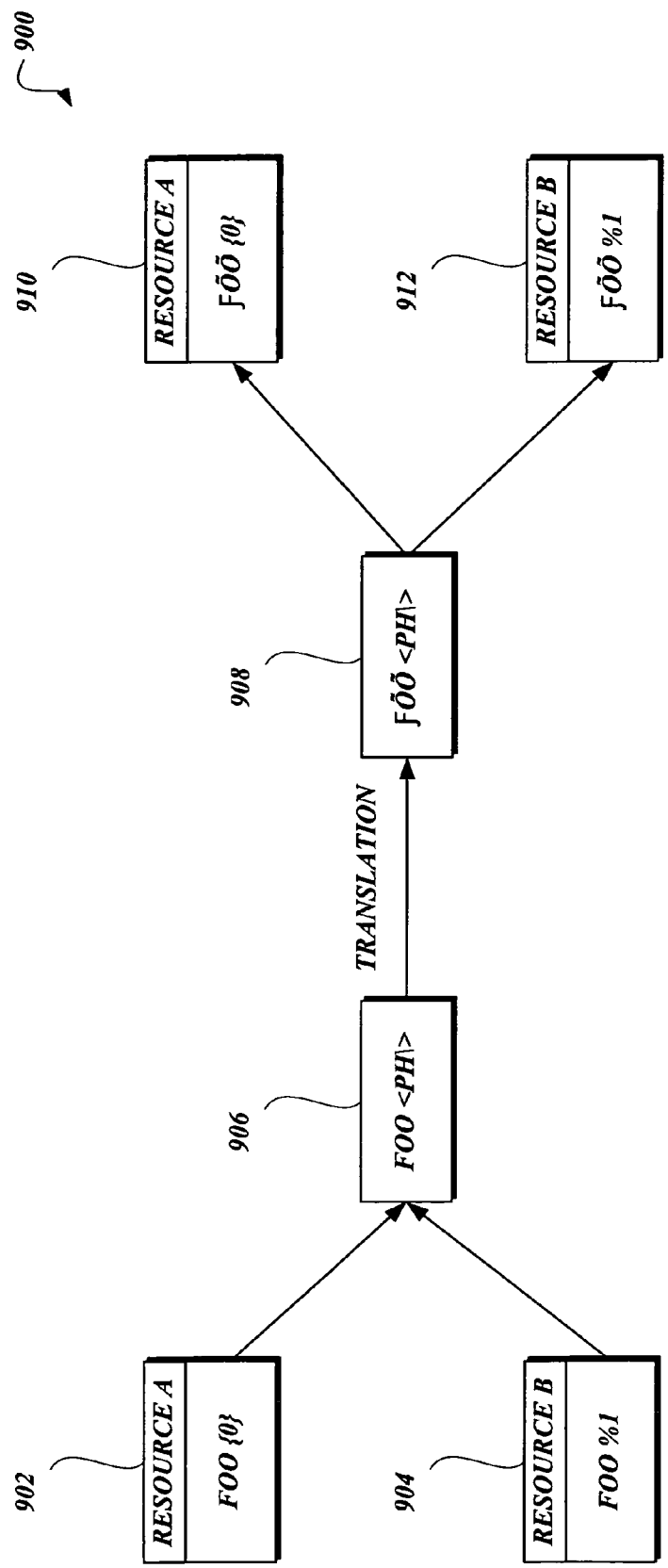
FIG. 9 is a block diagram depicting the resource-neutralization, translation, and resource-injection of two resources in accordance with an aspect of the present invention.

FIG. 9 is a block diagram 900 depicting the conversion of data from one or more resources into a resource-neutral format before being translated. In an illustrative embodiment, string "FOO {0}" can be associated with Resource A 902. Further, the substring "{0}" from "FOO {0}" can be associated with a placeholder restriction. A placeholder restriction can prevent an associated placeholder within a string from being translated. String "FOO %1" can be associated with Resource B 904. Further, the substring "%1" from "FOO %1" can be associated with a placeholder restriction. In an illustrative embodiment, Resource A 902 can be associated with one particular platform, whereas Resource B can be associated with a different platform.

Block 906 depicts the conversion of strings "FOO {0}" and "FOO %1" into a resource neutral format. In an illustrative embodiment, the respective placeholders "{0}" and "%1" can be converted into a resource neutral form (e.g., "<PH\>"). Between blocks 906 and 908, a pseudo-translation of the string can be performed to generate string "fÕÕ <PH\>", which is depicted at block 908. The placeholder restriction can prevent the placeholder ("<PH\>") from being pseudo-localized. At block 910, the string "fÕÕ <PH\>" can converted back into the resource-dependent form "fÕÕ {0}" which is dependent upon Resource A. Similarly, at block 912, the string "fÕÕ <PH\>" can be converted back into the resource-dependent form "fÕÕ {0}" which is dependent upon Resource B. By converting resource-dependent strings into a resource-neutral format before translating or performing other actions on the strings, the translating or processing code can be made simpler because the code only has to process data in a single resource-neutral format. In an illustrative embodiment, resource neutralization can be used to translate strings that differ only on locked portions. Further, placeholders and escaped characters are resource-dependent and can be transformed into resource-neutral forms.

Figure 10:
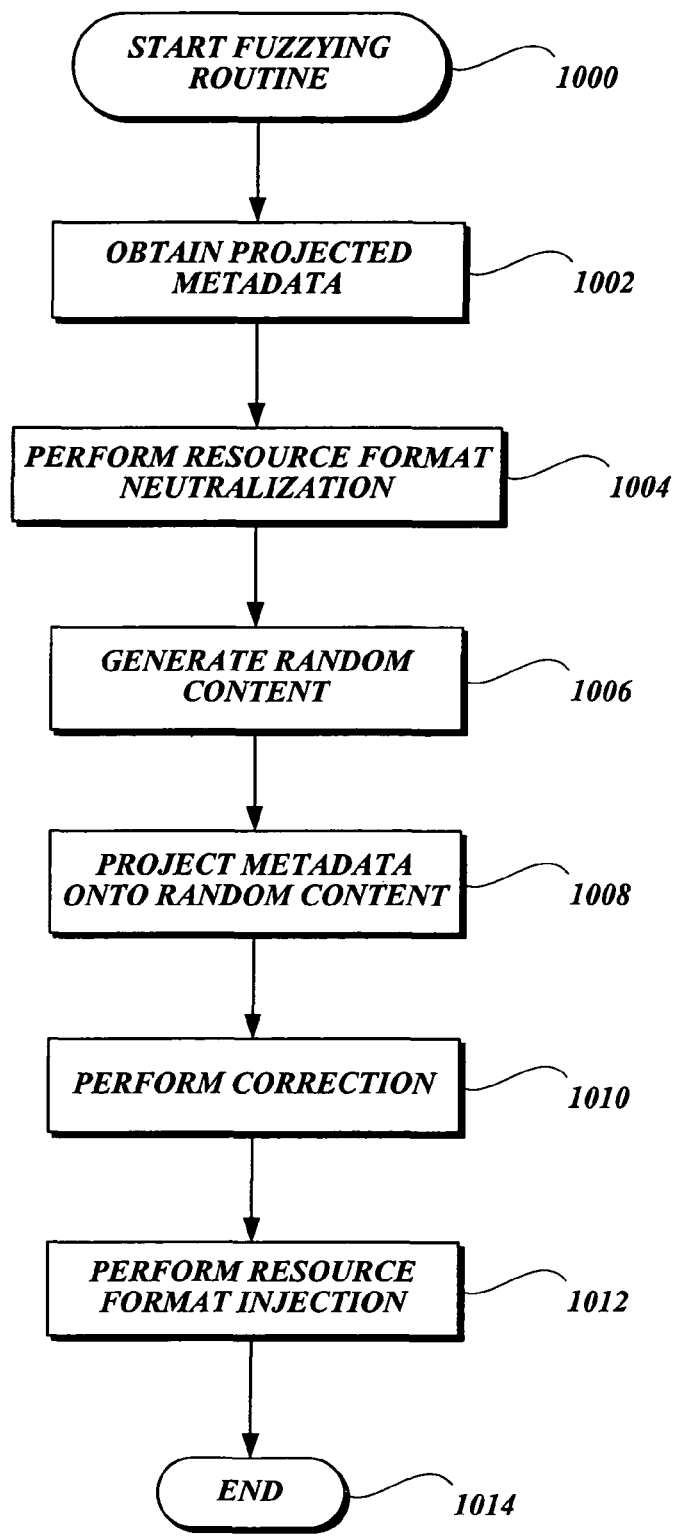
FIG. 10 is a flow diagram illustrating a fuzzying routine for generating test data in accordance with an aspect of the present invention.

FIG. 10 is a flow diagram illustrative of a fuzzying routine 1000 implemented by a translation component 404 in accordance with an aspect of the present invention. At block 1002, the translation component 404 obtains metadata that has been projected onto a string. At block 1004, resource-format neutralization can be performed on the string. As discussed above in relation to FIG. 9, resource-format neutralization can be used to convert resource-dependent portions of a string into a single resource-neutral format. At block 1006, random content is generated. The random content can be representative of a translated version of the string included in the projected metadata.

At block 1008, the metadata obtained at block 1002 is projected onto the random content. Further, at block 1010, the projected metadata can be used to modify the random content such that the random content satisfies the projected constraints. The projected metadata can include placeholders and escaped characters which are inserted into the random content such that the random content satisfies the projected constraints. At block 1012, any resource-neutral constraints that were inserted into the random content so that the random content would satisfy the projected constraints are converted into resource-dependent form. The fuzzying routine 1000 can be used to generate random content which satisfies metadata associated with a source string. In this manner, the fuzzying routine 1000 can create various pseudo-translations of a string which can be used for testing purposes. At block 1014, the routine 1000 terminates.

Figure 11:
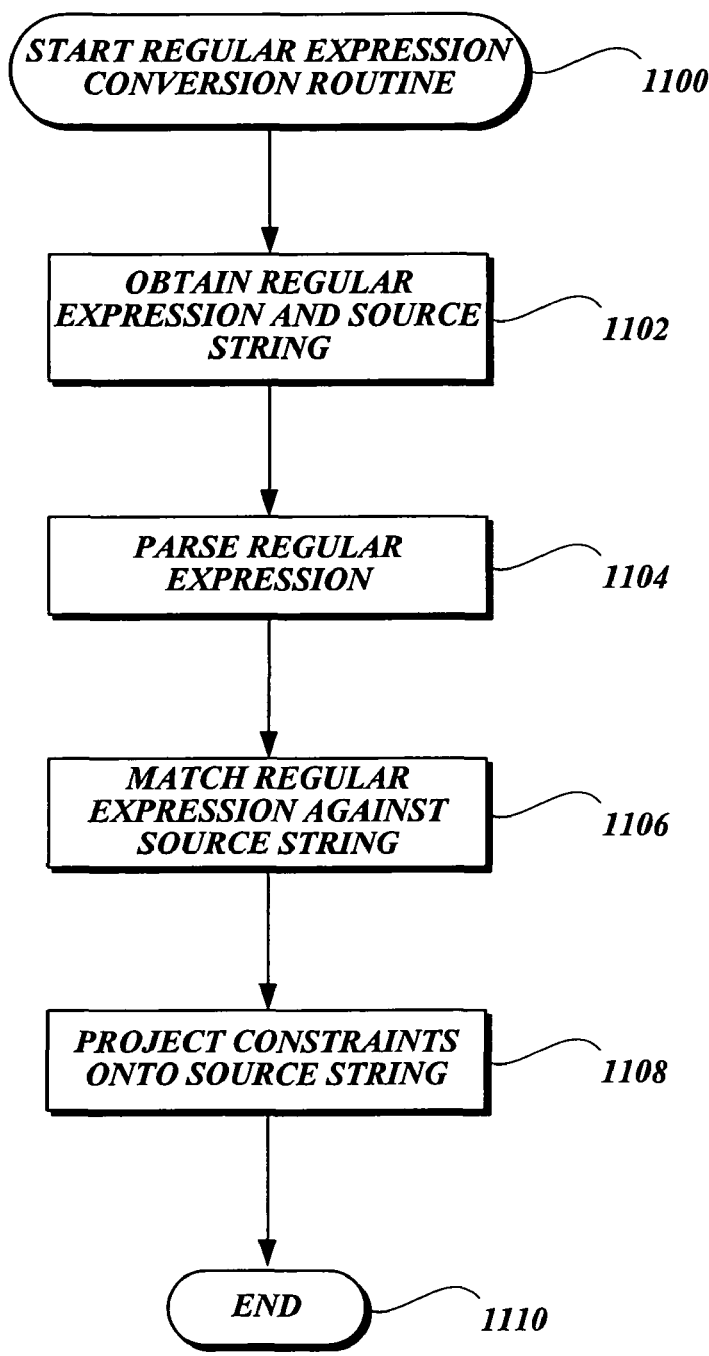
FIG. 11 is a flow diagram illustrating a regular-expression conversion routine implemented by a metadata compiler in accordance with an aspect of the present invention.

FIG. 11 is a flow diagram illustrative of a regular expression conversion routine 11000 implemented by a metadata compiler 104 in accordance with an aspect of the present invention. In an illustrative embodiment, regular expressions can be converted into metadata including one or more constraints which correspond to evaluation criteria and one or more corresponding anchor points. Converting regular expressions into metadata can simplify the metadata normalization and translation processes. At block 1102, the one or more metadata compilers 104 obtains a regular expression and a source string from an authoring user interface 302. For example, a metadata compiler 104 can obtain a source string such as "This is aa file" and a regular expression rule such as {Regex="a{2}"} from the authoring user interface 302. Regular expressions are well-known in the art and the one or more metadata compilers 104 are operable to process any regular expression. At block 1104, the one or more metadata compilers 104 can parse the regular expression such that metadata including one or more constraints and one or more corresponding anchor points can be derived from the regular expression.

With continued reference to FIG. 11, at block 1106, the metadata expression is matched against the source string. At block 1108, the constraints can be projected onto the source string. Using the example regular expression {Regex="a{2}"} and the example source string of "This is aa file", a lock constraint can be placed on the first occurrence of two consecutive 'a' characters in the source. Thus, a lock constraint can be placed on 'aa' in the source string "This is aa file". In another example, the one or more metadata compilers 104 can obtain the exemplary regular expression {Regex="a[abc] {3}"} to be matched against the exemplary source string "This is abbc file." The exemplary regular expression can be parsed to create a lock constraint on the first occurrence of an 'a' followed by three letters that are either 'a', 'b', or 'c', in addition to a valid characters constraint on the following three characters which must be either 'a', 'b', or 'c'. Additionally, a maximum length constraint with length 3 and a minimum Length constraint with length 3 would cover the same section. Matching the derived constraints to the exemplary source string "This is abbc file" would create a lock constraint on 'a' and the valid characters constraint, maximum length constraint, and minimum length constraint on the 'bbc' portion of the source string. In an exemplary embodiment, because the source string satisfies all constraints, the source string is valid. At block 1110, the routine 1100 terminates.

Referring back to FIG. 5D, in an illustrative embodiment, the split rule can be used with a regular expression parameter to generate some of the depicted constraints. For example, if a user wants to generate constraints such that only text sections of string 572 will be translated, a user can split the string using a regular expression. An exemplary split rule such as {Split=r":[0-9:]*:?"} can be used to perform the split. The 'r' parameter in the rule can indicate that what follows is a regular expression. Further, the one or more metadata compilers 104 converts the regular expression into lock constraints 576 and 588. Still further, the split rule generates substrings "FLY FROM BOTTOM", "FLY", and "FROM BOTTOM".

As discussed above, the substrings generated by a split rule can be used as parameters in other instructions. Thus, in addition to the split rule above, in an illustrative embodiment, a user can enter other rules using the substrings generated from the split rule as parameters. For example, to generate constraints 574, 578, and 584, a user can enter a rule of the form: {InvalidChars=s'0-2', ":"}. The 's' parameter can indicate that the instruction will generate constraints for the substrings 0, 1, and 2, which were generated by the split rule above. Thus, combining the split rule discussed above with an invalid characters rule, a user can restrict the substrings "FLY FROM BOTTOM", "FLY", and "FROM BOTTOM" from containing the sequence ":" as indicated by constraints 574, 578, and 584. Further, a user can use the substrings generated from the split rule as parameters in a rule to restrict maximum length. For example, a rule of the form: {MaxLen=s'0', 255} can be used to generate constraint 596. Likewise, an exemplary rule such as {MaxLen=s'1', 10} can generate constraint 590 while an exemplary rule such as {MaxLen=s'2', 35} can generate constraint 586.

FIGS. 6-11 illustrate various methods that may be performed according to various aspects of the present invention. However, it will be appreciated that the present invention can perform more or fewer methods than depicted by the illustrative figures. Further, the methods illustrated within each individual figure may include more or fewer elements than depicted in the illustrative figures.

Figure 12:
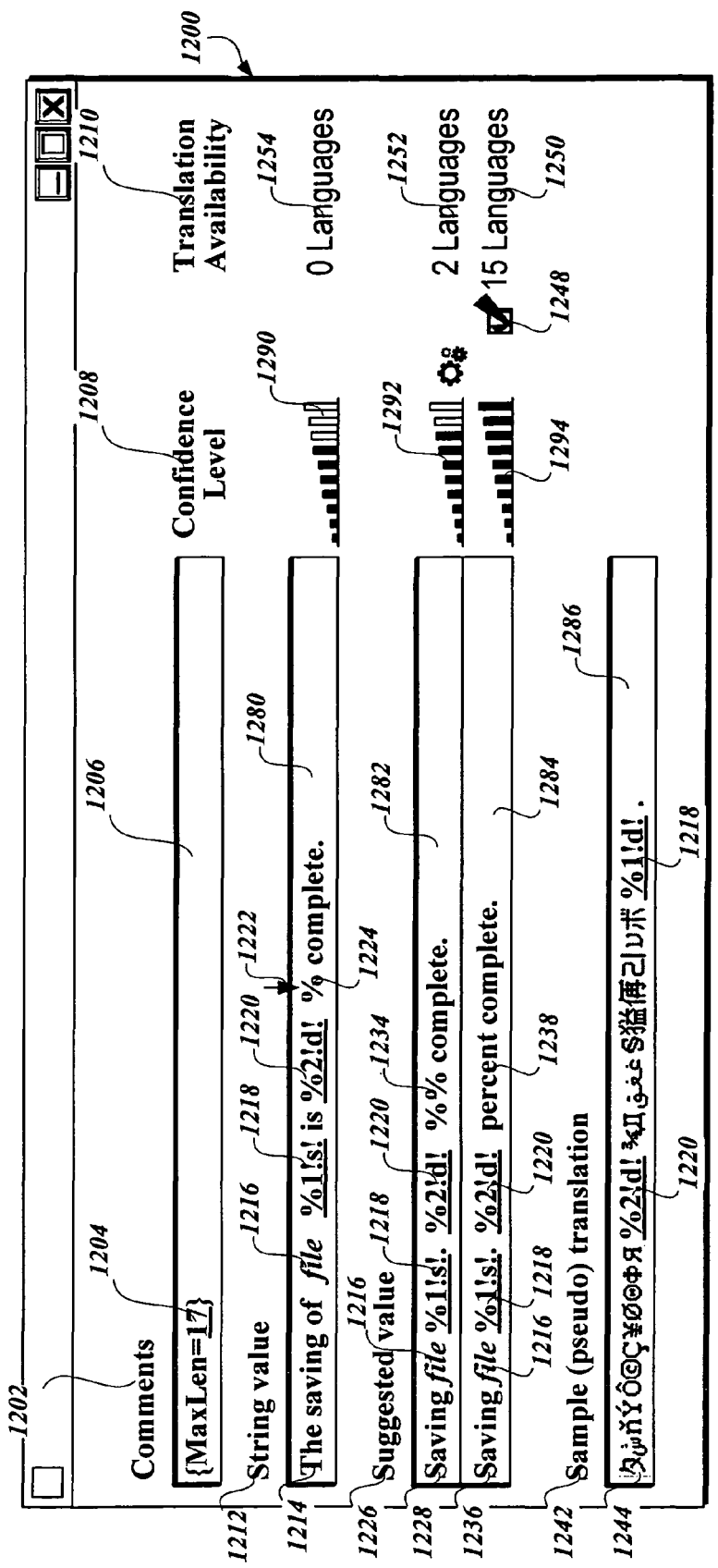
FIG. 12 is a block diagram of a user interface including a comment display portion, an input string display portion, a suggested values display portion, and a translation display portion in accordance with an aspect of the present invention.

With reference now to FIG. 12, an illustrative user interface 1200 for displaying a string 1214 along with associated comments 1202, suggested values 1228 and 1236, and a translation 1244 will be described. In an illustrative embodiment, a comment display portion 1206 can be operable to obtain and display comments associated with the string 1214. Comments can correspond to attributes. Comments can also correspond to rules that the one or more metadata compilers 104 can compile into constraints. For example, a user may enter a rule of the form {MaxLen=17} 1204 into the comment display portion 1206 to indicate that a maximum-length constraint operates on the entire string and limits valid strings to containing no more than 17 elements. Placeholders, escaped characters, valid and invalid characters, substring, split, and other types of constraints can be placed on a string 1214 by entering the corresponding rule into the comment display portion 1206 of the display 1200. Alternatively, a metadata compiler 104 can infer constraints by analyzing string 1214. In an illustrative embodiment, comments can also include resource information. Additionally, syntax errors in the comment display portion 1206 can be marked. Still further, rules can be marked if the corresponding string fails to validate against the rule. For example, the number "17" is underlined in rule {MaxLen=17} 1204 because the corresponding string 1214 contains more than 17 characters.

An input string display portion 1280 can be used to obtain and display a string 1214. In an illustrative embodiment, the value of the string 1212 is displayed as "The saving of file %1!s! is %2!d! % complete" 1214. Additionally, the string 1214 can be marked to alert the user of any constraints on the string 1214. For example, the word "file" 1216 is italicized to indicate that file is subject to a term constraint. Further, "%1!s!" 1218 is underlined to indicate a placeholder. As discussed above, a placeholder prevents the corresponding portion of the string from being translated. Likewise, "%2!d!" is also underlined to indicate a placeholder. As will be discussed in more detail below, placeholders 1218 and 1220 in the input string display portion 1280 may not be translated in the translation display portion 1286.

A percent sign ("%") 1224 can be marked with an arrow 1222 to indicate an escaped character constraint. However, any type of marking can be used to mark any of the constraints associated with the string 1214. For example, highlighting, color-coding, underlining, bold, italics, special characters, shading, arrows, or any other techniques can be used to mark the string 1214. Additionally, a string can be edited at a resource-neutral level. For example, string 1214 could be converted to a resource-neutral format and displayed to a user for editing. Further, a string can be displayed and edited in a format that corresponds to any resource. For example, a string corresponding to an exemplary resource A could be converted into a resource-neutral format and then resource-injected such that the string is displayed and editable in a format corresponding to an exemplary resource B.

Suggested value 1226 display portions 1282 and 1284 can be used to display suggested modifications 1228 and 1236 for input string 1214. For example, display portion 1282 may suggest that the percent sign ("%") 1224 be escaped 1234 because a certain resource interprets the percent sign 1224 as a special character. By escaping the percent sign 1234, the resource will not give the percent sign its special meaning. Similarly, display portion 1284 may suggest that the percent sign 1224 be replaced with the word "percent" 1238. A user may select one or more of the suggested values 1228 and 1236 for translation. The suggested values 1228 and 1236 can have more or fewer placeholders than the input string 1214. Additionally, metadata in the suggested values 1228 and 1236 can be visually indicated using various marking techniques. Suggested values 1228 and 1236 can be generated by a translation memory, by machine translation, or through other translation techniques. Further, suggestions can appear on the display 1200 as auto-completes as the user types.

In an illustrative embodiment, the input string display portion 1280 and suggested value display portions 1282 and 1284 can be associated with graphics that indicate confidence levels 1208 and translation availability 1210. For example, input string 1214 can be associated with a graphic 1290 that indicates how difficult it would be to machine translate. Further, a graphic 1254 can indicate the number of languages to which a string can be translated. For example, graphic 1254 can indicate that a translation memory has 0 associated translations for the particular input string 1214. Each suggested value display portion 1282 and 1284 can also be associated with a graphic 1292 and 1294 that indicates how difficult the respective, associated suggested values 1228 and 1236 would be to machine translate. Graphic 1292 visually indicates that suggested value "Saving file %1!s!. %2!d! %% complete." 1228 is available in 2 languages 1252, whereas graphic 1294 visually indicates that suggested value "Saving file %1!s!. %2!d! percent complete." 1236 is available in 15 languages 1250. The illustrative user interface 1200 can also include a graphic 1248 that visually indicates which suggested value is available in the most languages. Additionally, translation availability graphics 1210 and/or confidence level graphics 1208 can correspond to a specific market or markets.

In an illustrative embodiment, a translation 1244 of the source string 1214 or a suggested value 1228 or 1236 can be provided in a translation display portion 1286. In an illustrative embodiment, the translation can be a sample (pseudo) translation 1242, which can be produced using the fuzzying technique described above in relation to FIG. 10, for example. Additionally, a translation can be into any language. Typically, placeholders 1220 and 1218 will not be translated. Further, placeholders can be associated with functional portions of the string. In an illustrative embodiment, translation 1244 can be the result of a fuzzying technique that first generated random content and then corrected the random content according to metadata including one or more constraints and one or more corresponding anchor points. For example, placeholders 1220 and 1218 could have been placed in the random content to satisfy the constraints associated with the metadata of the corresponding source string 1214.

Spell-checking can be incorporated into the display 1200 and suggest corrections to misspelled words. Further, terms can be described as a mouse pointer hovers over the terms. Still further, differences between suggested values 1228 and 1236 and the input string 1214 can be marked to provide the user with a quick visual indication of the differences. Additionally, an indication of how input strings can be used can be provided. Further, terms can be marked to indicate that they are approved by certain organizations or groups. The display 1200 can be configurable such that the user can turn features on and off. Markings can be used to indicate any terms that have been replaced in the source string 1214. If a certain portion of a string is associated with a low confidence level, that portion can be indicated with markings. Additionally, functional problems in a translation 1244 can be marked and suggestions to correct functional problems can be displayed.

Figure 13:
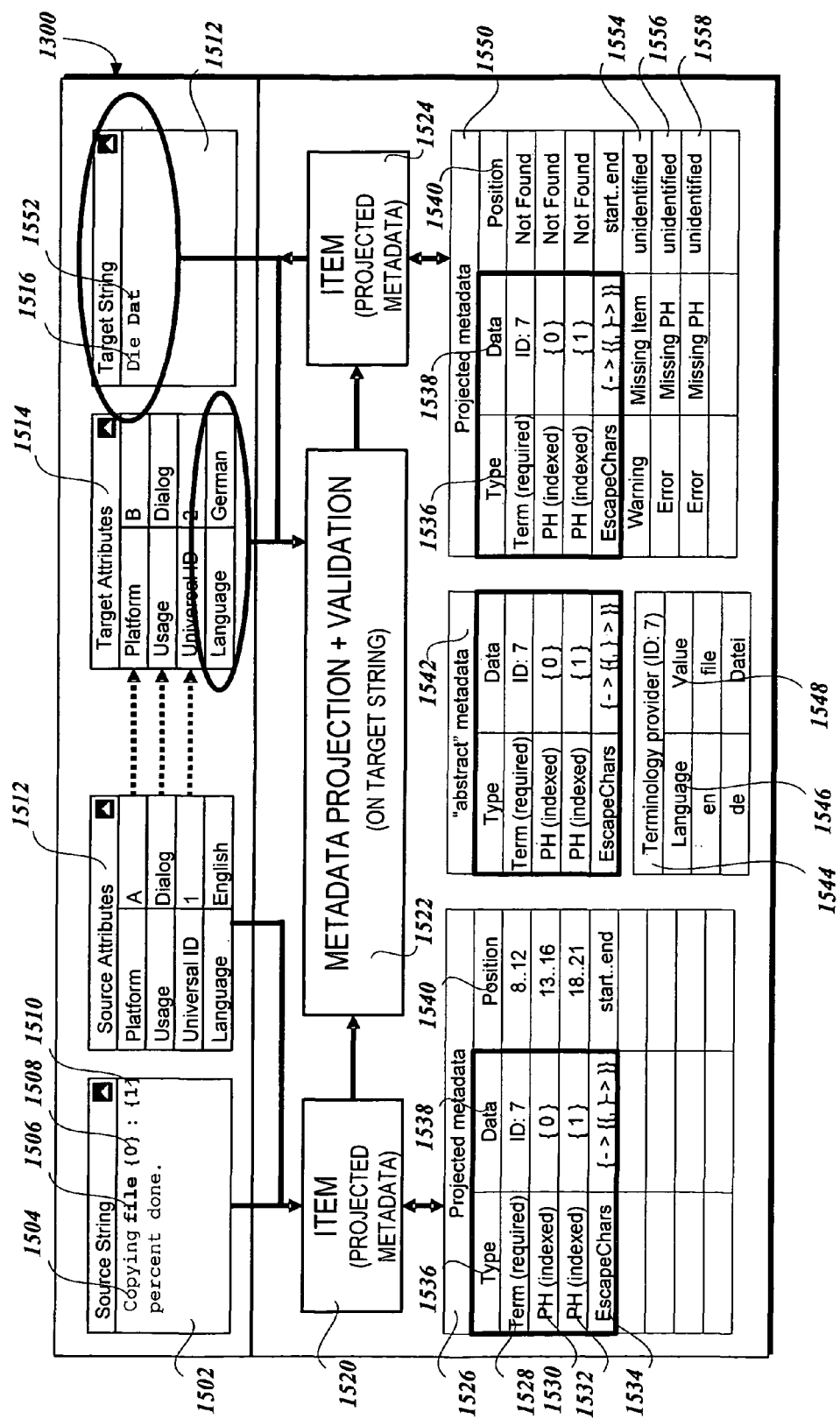
FIGS. 13-15 are block diagrams of a user interface including a source-string display portion, a target string display portion, a source metadata display portion, and a target metadata display portion formed in accordance with an aspect of the present invention.
Figure 14:
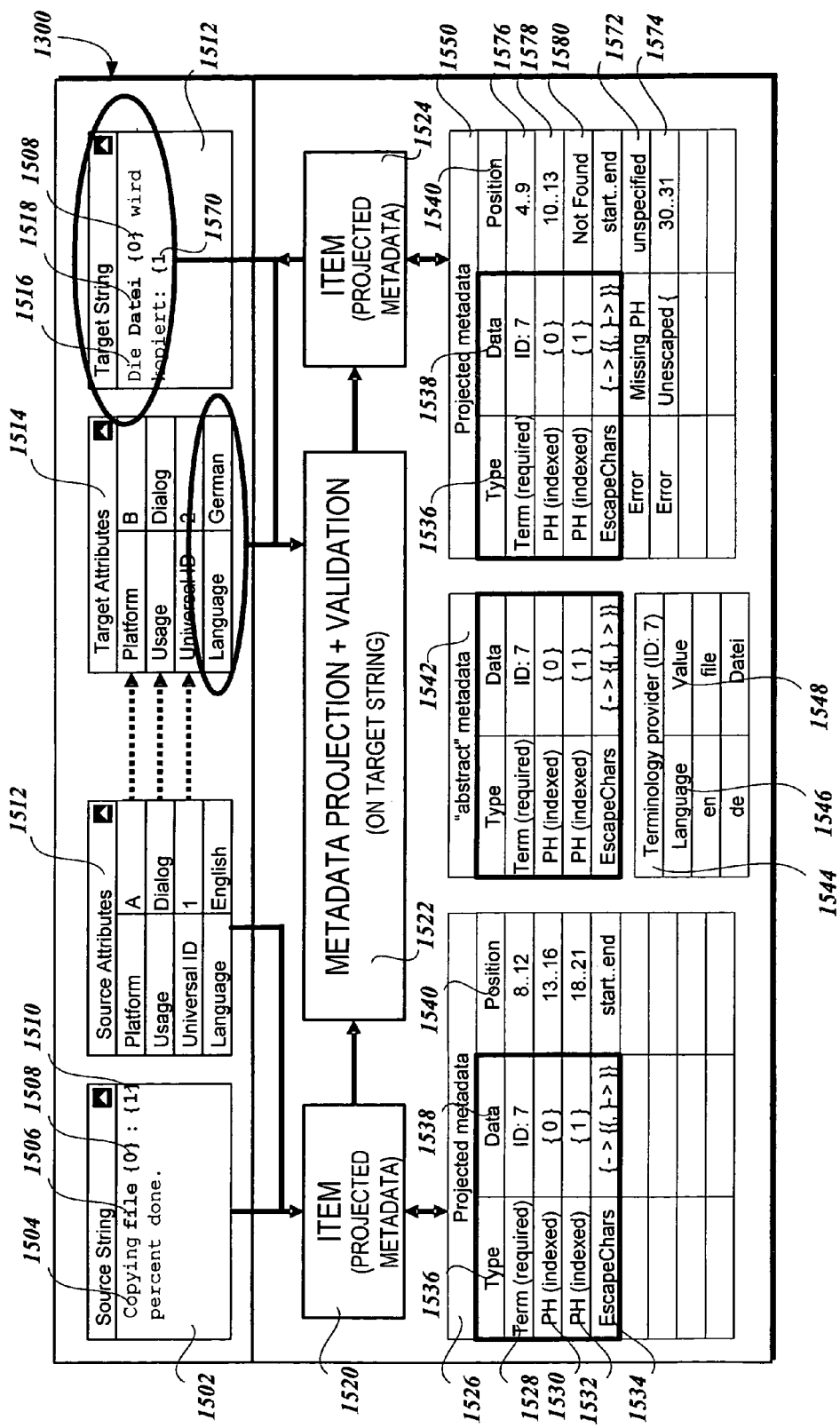
Figure 15:
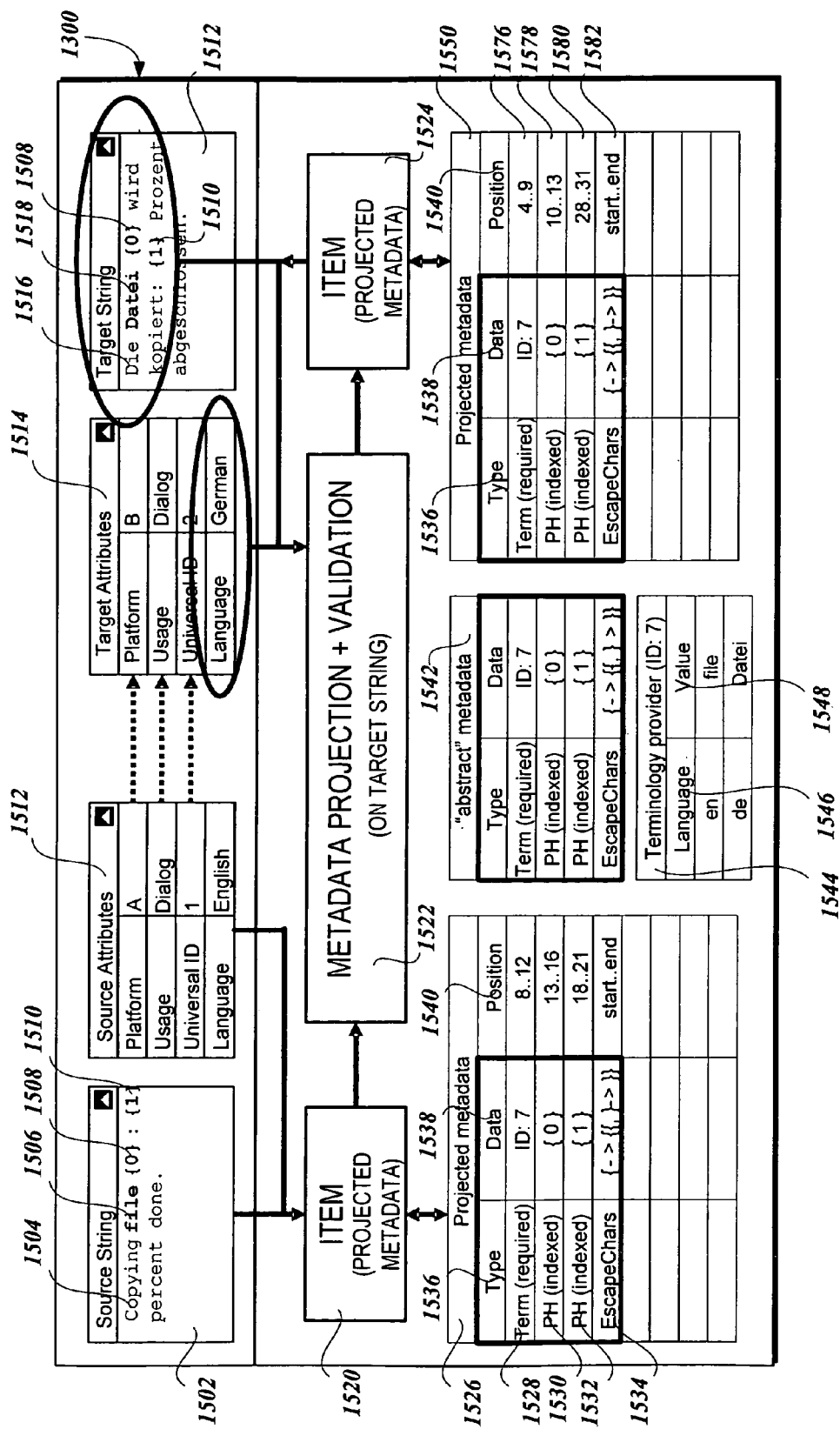

With reference now to FIGS. 13-15, an illustrative user interface 1300 for translating a source string 1504 in a source language into a target string 1516 in a target language will be described. As depicted on the overlaid diagram, on a high level, an item with projected metadata 1520 can be entered into an input string display portion 1502, the metadata can be projected onto a target string and validated 1522, and the target string 1516 can be displayed as an item with projected metadata 1524 on a translation display portion 1512. FIGS. 13-15 depict an exemplary iterative process a user can utilize to generate a target string 1516 that satisfies the metadata associated with a corresponding source string 1504.

With reference now to FIG. 13, tables representative of projected metadata 1526 and 1550 can be associated with the source string 1504 and target string 1516, respectively. Column 1536 of table 1526 can indicate the type of metadata, column 1538 can indicate which data from the string is associated with the metadata, and column 1540 can indicate the position of the metadata in relation to the string. Each constraint in the source string 1504 can be represented by a row in the displayed projected metadata table 1526. For example, row 1528 can indicate that a term constraint with an associated identification of "7" can be found between positions 8 and 12 on the source string 1504. The term constraint can correspond with the term "file" 1506. Term constraints in a source string can map to an equivalent term in a target string. Continuing with the example, row 1530 can indicate that an indexed placeholder represented by "{0}" 1508 can be found between positions 13 and 16 on the source string 1504. Similarly, row 1532 can indicate that an indexed placeholder represented by "{1}" 1510 can be found between positions 18 and 21 on the source string 1504. Row 1534 can indicate that a '{' character and a '}' character are subject to escaped character constraints and may be found anywhere within the source string 1504. Additionally, row 1534 can indicate that special character "{" can be escaped by the sequence "{{" while special character "}" can be escaped by the sequence "}}". Because the special characters "{" and "}" in the source string 1504 are not escaped, source string 1504 does not contain any escaped characters, except on the placeholders within the string. In addition to displaying the position of constraints on a string, the type or types of anchoring associated with a constraint can be displayed. For example, placeholders "{0}" 1508 and "{1}" 1510 can be loose anchored to the beginning and end of string 1504. An indication that placeholders 1508 and 1510 are loosely anchored to the beginning and end of the string can be displayed. Conversely, the escaped characters 1534 would be hard-anchored to the beginning and end of string 1504. An indication that the escaped characters constraint 1534 is hard-anchored to the beginning and end of the string can be displayed.

Still with reference to FIG. 13, various markings can be used as indicators in accordance with the metadata 1526 associated with the source string 1504. For example, bold font can be used in the source string 1504 to indicate that the term "file" 1506 is subject to a term constraint. Likewise, bold font can be used to mark the first indexed placeholder "{0}" 1508 and the second indexed placeholder "{1}" 1510. However, any type of marking can be used to visually alert a user to the metadata associated with a string. For example, italicized and other types of fonts, larger or smaller fonts, color-coding, extraneous characters on the display, highlighting, underlining, and shading can all be used to visually set off portions of a string that are associated with metadata.

A table of attributes 1512 and 1514 can be associated with the source 1504 and target 1516 strings respectively. The attribute tables 1512 and 1514 can indicate the associated resource or platform in addition to the usage of the string. For example, a string can be used in a dialog box. Further, the attribute tables 1512 and 1514 can indicate an identification of the platform and the language of the associated string. As discussed above, resource neutralization can be used to translate a string from a language on one platform into a different language on another platform. By using resource neutralization, a neutralized string can be translated once and then the resource-neutral portions of the string can be converted into resource-dependent portions such that the single translation can be used on several different resources. Thus, only one resource-neutral string is translated as opposed to several resource-dependent strings.

Table 1542 can be used to display abstract metadata pulled from the projected metadata displayed in table 1526. Abstract metadata can be placed against a string for validation. Because abstract metadata is not associated with a string, table 1542 may not include a position column 1540. Table 1544 can display information related to the translation. For example, a terminology provider and associated identification can be displayed. Column 1546 can display the source and target language of a corresponding term 1506. Additionally, column 1548 can display the source and target values of a corresponding term 1506. Suggested translations for other terms in the source string 1504 can also be displayed. Accordingly, table 1544 can assist the user in translating terms correctly.

As depicted in FIG. 13, a user can begin the process of translating source string 1504 by typing "Die Dat" 1516 into the target string display portion 1512. "Dat" 1552 can be marked in bold because it can be recognized as the beginning of the translation for "file" 1506 as displayed in table 1544. Additionally, table 1550 can be utilized by a user to determine which constraints are satisfied and which are not satisfied. For example, table 1550 displays the metadata gathered from the source string and its corresponding position 1540 on the target string 1516. Because the phrase "Die Dat" 1516 does not fulfill the requirements of the constraints shown in table 1550, the position column 1540 displays a "Not Found" message for each corresponding constraint. Further, table 1550 can display warning and error messages 1554, 1556, and 1558. For example, row 1554 can display a warning message indicating that the required term "Datei" has not been completely entered. Further, rows 1556 and 1558 can display error messages indicating that placeholders "{0}" 1508 and "{1}" 1510 are missing. Using these warning and error messages, a user can begin to correct the translation 1516. Alternatively, suggested corrections can be displayed as auto-completes for selection by the user.

As depicted in FIG. 14, a user can continue to enter a translation 1516 of the source string 1504. For example, a user can enter a translation 1518 of the required term "file" 1506. The translated term 1518 can be identified between positions 4 and 9 on the target string display portion 1512 as depicted in row 1576. Further, indexed placeholder "{0}" 1508 can be identified between positions 10 and 13 on the target string display portion 1512 as depicted in row 1578. Still further, the beginning of indexed placeholder "{1}" 1570 can be identified. In an illustrative embodiment, because indexed placeholder "{1}" 1510 is not entered correctly, the placeholder is labeled as "Not Found" in row 1580. Alternatively, because character "{" in item 1570 is unescaped and a required placeholder is missing, an error can be displayed as depicted in row 1574 indicating that item 1570 is invalid.

Still with reference to FIG. 14, various markings can be used as indicators in accordance with the metadata 1550 associated with the target string 1516. For example, bold font can be used to indicate that the term "Datei" 1518 is required in the target string 1504. Likewise, bold font can be used to mark the first indexed placeholder "{0}" 1508. Further, items that could correspond to a constraint when completely entered, such as item 1570, can also be marked in bold font. Any type of marking can be used to visually alert a user of the metadata associated with a string. For example, italicized and other types of fonts, larger or smaller fonts, color-coding, extraneous characters on the display, highlighting, underlining, and shading can all be used to visually set off portions of a string that are associated with metadata.

To assist in generating a valid target string 1516, error messages 1572 and 1574 can alert a user to portions of the string which do not satisfy the associated metadata. For example, row 1572 can indicate to the user that placeholder "{1}" 1510 is missing from the target string 1516. Still further, row 1574 can notify the user of an unescaped escape character. Because escape characters have special meaning, they can either be escaped or correspond to a constraint. A user can utilize the metadata 1550 and error messages 1572 and 1574 to generate a valid target string 1516.

FIG. 15 depicts an illustrative embodiment in which a valid target string 1516 has been entered into the target string display portion 1512. As described above, items 1518, 1508, and 1510 of the target string 1516 can correspond to constraints and can be marked in bold. Further, the position of each corresponding item can be depicted in column 1540. For example, column 1540 indicates that required term "Datei" 1518 can be found between positions 4 and 9 on the target string display portion 1512. Likewise, indexed placeholder "{0}" 1508 can be found between positions 10 and 13 while indexed placeholder "{1}" can be found between positions 28 and 31. Additionally, the lack of error and warning messages in table 1550 can indicate that a valid target string 1516 has been entered in the target string display portion 1512. Further, if any escaped characters are identified, the position of the escaped characters can be provided in column 1540 at row 1582.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for processing data for translation, the system comprising:
   a processor executing computer instructions implementing at least one compiler component configured to obtain source data comprising an example text string representative of proper formatting and to compile the example text string into metadata, wherein the metadata includes one or more constraints and one or more corresponding anchor points, and wherein the one or more constraints comprise string formatting criteria derived from formatting of the example text string, against which another string is evaluated, and the one or more corresponding anchor points define one or more string positions to which the one or more constraints apply;
   an optimization component configured to obtain the metadata from the at least one compiler component and to normalize the metadata, wherein normalizing the metadata includes consolidating duplicate constraints and resolving incompatibilities among conflicting constraints; and
   processing components configured to perform operations on a target string in a first language in accordance with the normalized metadata, the processing components comprising:
      a translation component configured to generate a translated string from the target string, the translated string being a translation of the target string into a second language;
      a projection component configured to map the one or more constraints of the normalized metadata to at least one portion of each of the target string and the translated string defined by the corresponding anchor points;
      a validation component configured to determine whether the at least one portion of each of the target string and the translated string defined by the corresponding anchor points satisfies the string formatting criteria derived from the formatting of the example text string, included in the one or more constraints of the normalized metadata mapped to the at least one portion of each of the target string and the translated string; and
      a correction component configured to modify the translated string, if it is determined by the validation component that one or more portions of the translated string do not satisfy the string formatting criteria, such that the at least one portion of the translated string defined by the corresponding anchor points satisfies the string formatting criteria derived from the formatting of the example text string, included in the one or more constraints of the normalized metadata mapped to the at least one portion of the translated string.

2. The system as recited in claim 1, wherein the validation component is further configured to display a result of the determining.

3. The system as recited in claim 1, wherein the processing components further include a marking component configured to mark at least one of the target string and the translated string according to the one or more constraints of the normalized metadata and a display component configured to display the marked at least one of the target string and the translated string on a display.

4. The system as recited in claim 1, wherein:
   the source data corresponds to one or more elements from the set comprising: a source string, a rule, and resource information; and
   a rule corresponds to one or more elements from the set comprising: a fixed placeholder, a numbered placeholder, escaped characters, escaped placeholder characters, invalid characters, valid characters, a positional parameter relating to a position within a string, a restriction relating to a character sequence that can be used to begin and/or end a string, and a restriction relating to a character sequence that must appear in a string.

5. The system as recited in claim 4, wherein a constraint comprises one or more elements from the set comprising:

a regular expression;

a lock constraint, indicating that a character sequence in a string should not be localized;

a terminology constraint, constraining the value of a character sequence in a string; and a count constraint, constraining the length of a string or the length of a character sequence within a string.

6. The system as recited in claim 4, wherein the at least one compiler component comprises:

at least a first compiler component configured to compile source data comprising a source string; and at least a second compiler component configured to compile source data comprising a source string and a rule.

7. A system for processing data for translation, the system comprising:

a processor executing computer instructions implementing at least one compiler component configured to obtain source data, comprising an example string representative of proper formatting, and to compile the example string into metadata, wherein the metadata includes one or more constraints and one or more anchor points, and wherein the one or more constraints comprise string formatting criteria derived from formatting of the example string, against which another string is evaluated, and the one or more anchor points define one or more string positions to which the one or more constraints apply;

an optimization component configured to obtain the metadata from the at least one compiler component and to normalize the metadata;

a translation component configured to obtain the metadata and a target string in a first language as input and to generate a translated string utilizing the metadata, the translated string being a translation of the target string into a second language;

a validation component configured to validate, for each of the one or more constraints of the metadata, that at least a portion of the target string and a portion of the translated string satisfy the constraint, wherein the at least a portion of the target string and a portion of the translated string are defined by the one or more anchor points;

a marking component configured to mark at least one of the target string and the translated string to indicate any portion of the at least one of the target string and the translated string that does not satisfy the string formatting criteria derived from the formatting of the example string; and a display component configured to display the marked at least one of the target string and the translated string on a display.

8. The system as recited in claim 7, further comprising a projection component configured to obtain user input from a translation display and metadata from the optimization component and generate projected metadata.

9. The system as recited in claim 7, further comprising a correction component configured to obtain the translated string from the translation component, modify the translated string using the metadata, and cause the modified translated string to be displayed.

10. A computer storage medium having computer executable components for processing data, wherein the computer executable components include:

at least one compiler component configured to generate metadata from an example text string representative of proper formatting, wherein the metadata includes one or more constraints and one or more anchor points, and wherein the one or more constraints comprise string formatting criteria derived from formatting of the example text string, against which a target text string is evaluated, and the one or more anchor points define, for each constraint, a portion of the target text string to which the constraint applies;

an optimization component configured to normalize the metadata, wherein normalizing the metadata includes consolidating duplicate constraints and resolving incompatibilities among conflicting constraints; and one or more processing components configured to process the target text string according to the one or more constraints and the one or more anchor points of the normalized metadata, wherein the one or more processing components include a projection component configured to project the one or more constraints of the normalized metadata onto the target text string according to the one or more anchor points, and wherein the one or more processing components include a display component configured to display one or more suggested modifications selectable by a user to modify the target text string to satisfy the string formatting criteria derived from the formatting of the example text string.

11. The computer storage medium as recited in claim 10, wherein the one or more processing components include a validation component configured to validate the target text string against the one or more constraints of the normalized metadata.

12. The computer storage medium as recited in claim 11, wherein the validation component obtains abstract metadata from the optimization component, and wherein the validation component validates the target text string using the abstract metadata.

13. The computer storage medium as recited in claim 10, wherein the one or more processing components include a correction component configured to correct the target text string such that the one or more constraints of the normalized metadata may be satisfied.

14. The computer storage medium as recited in claim 10, wherein the one or more processing components include a marking component configured to mark the target text string according to the one or more constraints of the normalized metadata, and the display component is further configured to display the marked target text string to the user.

15. The computer storage medium as recited in claim 10, wherein the computer executable components further include a translation component configured to translate the target text string according to the one or more constraints of the normalized metadata.

16. The computer storage medium as recited in claim 15, wherein the translation component obtains validated data from a validation component, and wherein the translation component generates a translation for display to a user.

* * * * *